US012627836B2

(12) United States Patent
Dumas et al.

(10) Patent No.: US 12,627,836 B2
(45) Date of Patent: May 12, 2026

(54) DEEP INTRA PREDICTOR GENERATING SIDE INFORMATION

(71) Applicant: INTERDIGITAL MADISON PATENT HOLDINGS, SAS, Paris (FR)

(72) Inventors: Thierry Dumas, Rennes (FR); Franck Galpin, Thorigne-Fouillard (FR); Jean Begaint, Menlo Park, CA (US); Fabien Racape, San Francisco, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 86 days.

(21) Appl. No.: 17/767,989

(22) PCT Filed: Oct. 9, 2020

(86) PCT No.: PCT/EP2020/078460
§ 371 (c)(1),
(2) Date: Apr. 11, 2022

(87) PCT Pub. No.: WO2021/069688
PCT Pub. Date: Apr. 15, 2021

(65) Prior Publication Data
US 2023/0254507 A1 Aug. 10, 2023

(30) Foreign Application Priority Data
Oct. 11, 2019 (EP) ...................................... 19306330

(51) Int. Cl.
*H04N 19/593* (2014.01)
*H04N 19/11* (2014.01)
(Continued)

(52) U.S. Cl.
CPC ........... *H04N 19/593* (2014.11); *H04N 19/11* (2014.11); *H04N 19/172* (2014.11);
(Continued)

(58) Field of Classification Search
CPC .... H04N 19/176; H04N 19/11; H04N 19/593; H04N 19/105; H04N 19/70;
(Continued)

(56) References Cited

U.S. PATENT DOCUMENTS

| | | |
|---|---|---|
| 2013/0064292 A1 | 3/2013 | Song et al. |
| 2019/0246102 A1 | 8/2019 | Cho et al. |

(Continued)

FOREIGN PATENT DOCUMENTS

| | | |
|---|---|---|
| CN | 102907100 A | 1/2013 |
| GB | 2575628 A | 1/2020 |

(Continued)

OTHER PUBLICATIONS

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, 12 pages.

(Continued)

*Primary Examiner* — Nathnael Aynalem
(74) *Attorney, Agent, or Firm* — Condo Roccia Koptiw LLP

(57) ABSTRACT

At least a method and an apparatus are presented for efficiently encoding or decoding video. For example, an intra prediction of an image block and side information are determined using at least one neural network from a context comprising pixels surrounding the image block. The side information allows a decoder to determine the intra prediction and is signaled for the decoding.

18 Claims, 14 Drawing Sheets

(51) Int. Cl.

| | |
|---|---|
| *H04N 19/172* | (2014.01) |
| *H04N 19/176* | (2014.01) |
| *H04N 19/186* | (2014.01) |
| *H04N 19/42* | (2014.01) |
| *H04N 19/70* | (2014.01) |

(52) U.S. Cl.
CPC ......... *H04N 19/176* (2014.11); *H04N 19/186* (2014.11); *H04N 19/42* (2014.11); *H04N 19/70* (2014.11)

(58) Field of Classification Search
CPC .... H04N 19/132; H04N 19/159; H04N 19/46; H04N 19/13; H04N 19/186; H04N 19/61; H04N 19/12; H04N 19/122; H04N 19/124; H04N 19/134; H04N 19/147; H04N 19/167; H04N 19/172; H04N 19/182; H04N 19/192; H04N 19/42; H04N 19/436; H04N 19/88; H04N 19/91; H04N 19/50; H04N 19/503; G06T 9/002; G06N 3/02; G06N 3/045; G06N 3/08
USPC ............................................ 375/240–240.29
See application file for complete search history.

(56) References Cited

U.S. PATENT DOCUMENTS

| | | | | |
|---|---|---|---|---|
| 2020/0137384 | A1* | 4/2020 | Kwong ................... | H04N 19/11 |
| 2020/0186809 | A1* | 6/2020 | Mukherjee ............. | G06N 3/088 |
| 2020/0244955 | A1 | 7/2020 | Pfaff et al. | |
| 2020/0280717 | A1* | 9/2020 | Li ............................ | G06N 3/08 |
| 2021/0014531 | A1* | 1/2021 | Pfaff .................... | H04N 19/593 |
| 2021/0021823 | A1* | 1/2021 | Na ........................ | H04N 19/176 |
| 2021/0211709 | A1* | 7/2021 | Zhang ................... | H04N 19/129 |
| 2021/0235104 | A1* | 7/2021 | Huo ........................ | H04N 19/50 |
| 2021/0314562 | A1* | 10/2021 | Kang ................... | H04N 19/139 |
| 2022/0191548 | A1* | 6/2022 | Yu ........................ | H04N 19/186 |

FOREIGN PATENT DOCUMENTS

| | | |
|---|---|---|
| TW | 201924331 A | 6/2019 |
| WO | 2019011968 A1 | 1/2019 |
| WO | 2019029560 A1 | 2/2019 |
| WO | 2019194425 A1 | 10/2019 |

OTHER PUBLICATIONS

Hu et al., "Progressive Spatial Recurrent Neural Network for Intra Prediction", Institute of Electrical and Electronics Engineers (IEEE), IEEE Transactions on MultiMedia, vol. 21, Issue: 12, Dec. 2019, 14 pages.

Anonymous, "Versatile Video Coding", International Telecommunication Union, ITU-T Telecommunication Standardization Sector of ITU, Series H: Audiovisual and Multimedia Systems, Infrastructure of audiovisual services—Coding of moving video, Recommendation Itu-T H.266, Aug. 2020, 516 pages.

Anonymous, "Series H: Audiovisual and Multimedia Systems, Infrastructure of audiovisual services—Coding of moving video—Information Technology—Generic coding of moving pictures and associated audio information: Video", International Telecommunication Union, ITU-T Telecommunication Standardization Sector of ITU, Recommendation ITU-T H.262, Feb. 2000, 220 pages.

Minnen et al., "Spatially Adaptive Image Compression using a Tiled Deep Network", Institute of Electrical and Electronics Engineers (IEEE), 2017 IEEE International Conference on Image Processing (ICIP), Beijing, China, Feb. 22, 2018, 6 pages.

Brand et al., "Intra Frame Prediction for Video Coding Using a Conditional Autoencoder Approach", Institute of Electrical and Electronics Engineers (IEEE), 2019 Picture Coding Symposium (PCS), Ningbo, China, Nov. 15, 2019, 6 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Pfaff et al., Intra Prediction Modes based on Neural Networks, Joint Video Exploration Team (JVET) of ITU-T SG 16 WP 3 and ISO/IEC JTC 1/SC 29/WG 11, Document: JVET-J0037-v1, 10th Meeting, San Diego, California, USA, Apr. 10, 2018, 14 pages.

Pathak et al., "Context Encoders: Feature Learning by Inpainting", Institute of Electrical and Electronics Engineers (IEEE), 2016 IEEE Conference on Computer Vision and Pattern Recognition (CVPR), Las Vegas, Nevada, USA, Jun. 27, 2016, 12 pages.

Pfaff et al., CE3: Affine linear weighted intra prediction (CE3-4.1, CE3-4.2), Joint Video Experts Team (JVET) of ITU-T SG 16 WP 3 and ISO/IEC JTC 1/SC 29/WG 11, Document: JVET-N0217, 14th Meeting, Geneva, Switzerland, Mar. 19, 2019, 17 pages.

Wang et al., "Enhancing HEVC Spatial Prediction by Context-Based Learning", Institute of Electrical and Electronics Engineers (IEEE), ICASSP 2019—2019 IEEE International Conference on Acoustics, Speech and Signal Processing (ICASSP), Brighton, United Kingdom, May 12, 2019, 6 pages.

Li et al., "Fully-Connected Network-Based Intra Prediction for Image Coding", Institute of Electrical and Electronics Engineers (IEEE), IEEE Transactions on Image Processing, vol. 27, No. 7, Jul. 2018, 12 pages.

Dumas et al., "Context-Adaptive Neural Network-Based Prediction for Image Compression", Institute of Electrical and Electronics Engineers (IEEE), IEEE Transactions on Image Processing, vol. 29, Aug. 16, 2019, 16 pages.

* cited by examiner

☒   current square block $Y$ of size $W \times W$

⌐   context $X_c$

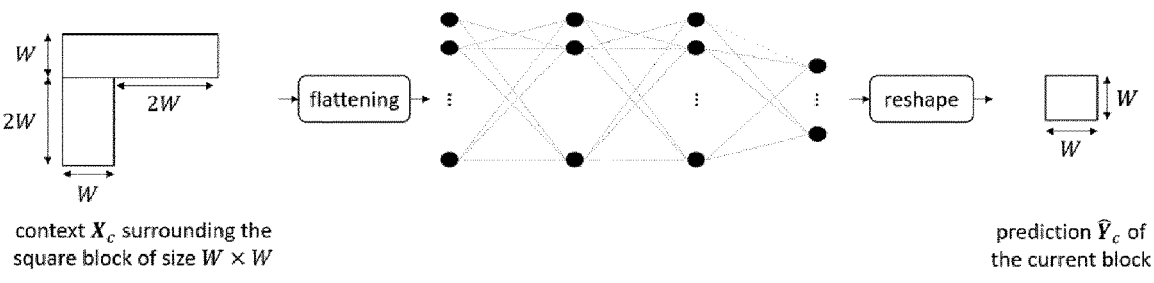

context $X_c$ surrounding the
square block of size $W \times W$ prediction $\hat{Y}_c$ of
the current block ------ connection in the fully-connected layer

Figure 6b

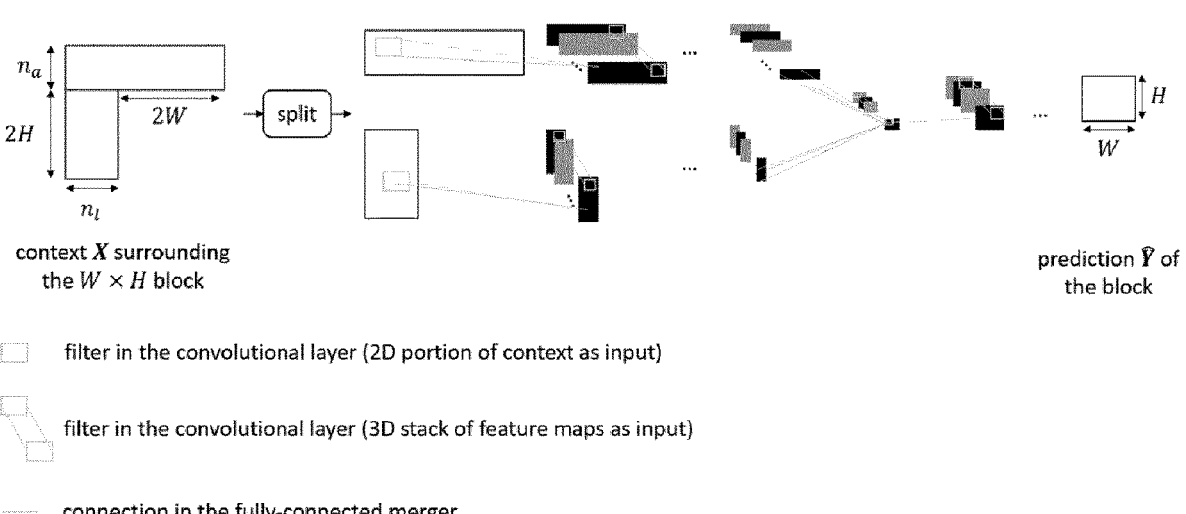

context $X$ surrounding
the $W \times H$ block prediction $\hat{Y}$ of
the block ☐     filter in the convolutional layer (2D portion of context as input)

filter in the convolutional layer (3D stack of feature maps as input)

------ connection in the fully-connected merger

Figure 6c

------→ writing in raster-scan order

------→ reading in raster-scan order

DEEP INTRA PREDICTOR GENERATING SIDE INFORMATION

CROSS REFERENCE TO RELATED APPLICATIONS

This application is a U.S. National Stage Application under 35 U.S.C. 371 of International Patent Application No. Application No. PCT/EP2020/078460, filed Oct. 9, 2020, which is incorporated herein by reference in its entirety.

This application claims the benefit of European Patent Application No. 19306330.2, filed Oct. 11, 2019, which is incorporated herein by reference in its entirety.

TECHNICAL FIELD

At least one of the present embodiments generally relates to a method or an apparatus for video encoding or decoding, and more particularly, to a method or an apparatus that obtains a neural network intra prediction and side information using a neural network from at least one input data; and encodes or decodes the side information and an image block using the neural network intra prediction.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlations, then the difference between an original image block and its prediction, often denoted as prediction error or prediction residual, is transformed, quantized, and entropy coded. To reconstruct the video, the compressed data are decoded by inverse processes corresponding to the entropy coding, quantization, transform, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

Recent works introduce deep neural networks for improving video compression efficiency in terms of bitrate savings. For instance, a deep intra predictor infers from the context surrounding the current block to be predicted a prediction of this block. According to previous works related to the learning of a deep intra predictor for image and video compression, when the learned deep intra predictor is inserted into a video codec, such as HEVC for instance, it is always at least one additional intra prediction mode, in competition with the existing ones. Indeed, the intra prediction component of video codecs cannot rely on the deep intra predictor alone because of the "failure cases". A "failure case" refers to a situation where the learned deep intra predictor infers a prediction of the current block of relatively low quality, compared to the prediction with the best quality among the predictions provided by the regular intra prediction modes in the video codec of interest. In general, a "failure case" occurs when the information in the context is not enough for inferring a prediction of the current block of good quality or, roughly speaking, the context is too decorrelated from the current block.

SUMMARY

The drawbacks and disadvantages of the prior art are solved and addressed by the general aspects described herein, which are directed to a deep intra predictor generating side information. According to at least one embodiment, the deep intra predictor generates side information on the encoder side, the side information is written to the bitstream, and the deep intra prediction reads the side information on the decoder side. This way, it is possible to transmit from the encoder to the decoder information to supplement the information contained in the context surrounding the current block to be predicted.

According to a first aspect, there is provided a method. The method comprises determining, for a block being encoded, a neural network intra prediction and side information using a neural network from at least one input data; encoding the block based on the neural network intra prediction; and encoding the side information.

According to another aspect, there is provided a second method. The method comprises obtaining, for a block being decoded, side information relative to a neural network intra prediction; determining, for the block being decoded, a neural network intra prediction using a neural network applied to at least one input data and the side information; and decoding the block using said determined neural network intra prediction.

According to another aspect, there is provided an apparatus. The apparatus comprises one or more processors, wherein the one or more processors are configured to: determine, for a block being encoded, a neural network intra prediction and side information using a neural network from at least one input data; encode the block based on the neural network intra prediction; and encode the side information.

According to another aspect, there is provided another apparatus. The apparatus comprises one or more processors, wherein the one or more processors are configured to: obtain, for a block being decoded, side information relative to a neural network intra prediction; determining, for the block being decoded, a neural network intra prediction using a neural network applied to at least one input data and the side information; and decoding the block using the determined neural network intra prediction.

According to another general aspect of at least one embodiment, the neural network is fully-connected and side information Z is a vector whose coefficients belong to $[0,1]$. In a variant, the vector Z is converted into a vector of bits by applying an elementwise threshold of 0.5 to the vector Z. In another variant, the elementwise threshold value is different from 0.5.

According to another general aspect of at least one embodiment, the neural network is convolutional and wherein side information Z is a stack of feature maps whose coefficients belong to $[0, 1]$. In a variant, the stack of feature maps Z is converted into a stack of feature maps of bits by applying an elementwise threshold of 0.5 to Z. In another variant, the elementwise threshold value is different from 0.5.

According to another general aspect of at least one embodiment, side information Z is a vector or a stack of feature maps whose coefficients belong to $\mathbb{R}$ and the coefficients of side information are quantized via either scalar quantization or vector quantization. Then, the absolute value of each quantized coefficient is encoded losslessly via arithmetic coding. A CABAC context can be used for the arithmetic coding of the absolute value of each quantized coefficient.

According to another general aspect of at least one embodiment, side information Z is a vector or a stack of feature maps whose coefficients belong to $[-1, 1]$ and the coefficients of side information are mapped to $\{0, 1\}$.

According to another general aspect of at least one embodiment, for luma block Y, the input data of the encoding comprises a context $X_c$ surrounding the current luma block Y and luma block Y.

According to another general aspect of at least one embodiment, for luma block Y, the input data of the decoding comprises a context $X_c$ surrounding the current luma block Y and the decoded side information.

According to another general aspect of at least one embodiment, for a chroma block $Y^{CbCr}$, the input data of the encoding comprises a context $X_c^{CbCr}$ surrounding the chroma block $Y^{CbCr}$, the context $X_c^Y$ surrounding the luma block $Y^Y$ that is collocated with the chroma block, and the current chroma block $Y^{CbCr}$.

According to another general aspect of at least one embodiment, for a chroma block $Y^{CbCr}$, the input data of the encoding comprises the context $X_c^Y$ surrounding the luma block $Y^Y$ that is collocated with the chroma block, and the current chroma block $Y^{CbCr}$.

According to another general aspect of at least one embodiment, for a chroma block $Y^{CbCr}$, the input data of the encoding comprises a context $X_c^{CbCr}$ surrounding the chroma block $Y^{CbCr}$, the context $X_c^Y$ surrounding the luma block $Y^Y$ that is collocated with the chroma block, the current chroma block $Y^{CbCr}$, and the reconstructed luma block $\hat{Y}^Y$.

According to another general aspect of at least one embodiment, for a chroma block $Y^{CbCr}$, the input data of the decoding comprises a context $X_c^{CbCr}$ surrounding the chroma block $Y^{CbCr}$, the context $X_c^Y$ surrounding the luma block $Y^Y$ that is collocated with the chroma block and the decoded side information.

According to another general aspect of at least one embodiment, for a chroma block $Y^{CbCr}$, the input data of the decoding comprises the context $X_c^Y$ surrounding the luma block $Y^Y$ that is collocated with the chroma block and the decoded side information.

According to another general aspect of at least one embodiment, for a chroma block $Y^{CbCr}$, the input data of the decoding comprises a context $X_c^{CbCr}$ surrounding the chroma block $Y^{CbCr}$, the context $X_c^Y$ surrounding the luma block $Y^Y$ that is collocated with the chroma block, the reconstructed luma block $\hat{Y}^Y$ and the decoded side information.

According to another general aspect of at least one embodiment, the input data further comprises the intra prediction mode L of the block located on the left side of the block being encoded/decoded and the intra prediction mode A of the block located above the block being encoded/decoded.

According to another general aspect of at least one embodiment, for intra prediction of a luma block, a syntax element DeepFlag representative of a neural network-based intra prediction mode (i.e. the neural network-based intra prediction mode is selected to predict the current block) is encoded among syntax elements of intra prediction.

According to another general aspect of at least one embodiment, for intra prediction of a luma block, the neural network-based intra prediction mode is always selected. This means that all regular syntax elements of luma intra prediction and DeepFlag do not exist.

According to another general aspect of at least one embodiment, for intra prediction of a luma block, a syntax element DeepFlag representative of a neural network-based intra prediction mode is encoded and if DeepFlag is set to one the luma block is intra predicted using a neural network-based intra prediction mode else if DeepFlag is set to zero, the luma block is intra predicted using planar mode.

According to another general aspect of at least one embodiment, for intra prediction of a chroma block, the neural network-based intra prediction mode is always selected.

According to another general aspect of at least one embodiment, for intra prediction of a chroma block, a syntax element DeepFlag representative of a neural network-based intra prediction mode is encoded among syntax elements of intra prediction.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated.

FIG. 6b illustrates an example of intra prediction via a fully-connected neural network in which various aspects of the embodiments may be implemented.

FIG. 6c illustrates an example of intra prediction via a convolutional neural network in which various aspects of the embodiments may be implemented.

DETAILED DESCRIPTION

We firstly introduce the intra prediction component of video codecs, then various embodiments of a deep intra predictor implemented in an encoder or a decoder according to the present principles are disclosed. Finally, various embodiments of an encoder or decoder in which the present principles are implemented are presented.

The present principles are described in the context on the video codec H.266/VVC as it is currently viewed as the best video codec in terms of compression performance. However, the present principles are compatible with any codec.

The intra prediction process in H.266/VVC consists of gathering reference samples, processing them, deriving the actual prediction of the samples of the current block, and finally post-processing the predicted samples.

Figure 1:
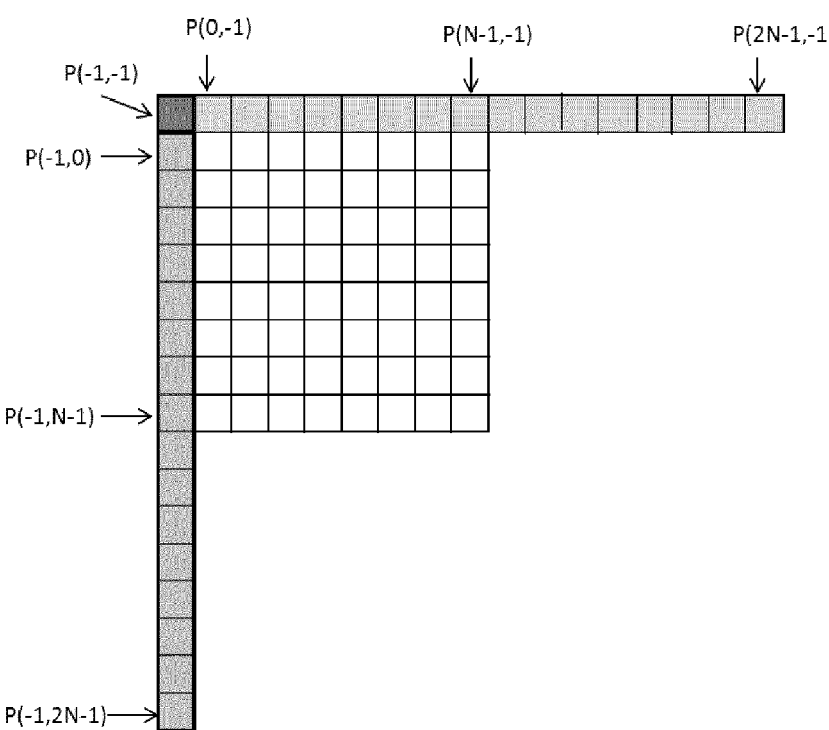
FIG. 1 illustrates an example of reference sample for intra prediction in VVC.

FIG. 1 illustrates reference samples for intra prediction in H.266/VVC in the case of a square current block (W=H=N), the pixel values at coordinates (x,y) being indicated in FIG. 1 by P(x,y). An array of 2 W samples on the top is formed from the previously reconstructed top and top-right pixels to the current block, W denoting the block width. Similarly, a column of 2H samples on the left is formed from the reconstructed left and below left pixels, H denoting the block height. The corner pixel at the top-left position is also used to fill up the gap between the top row and the left column references. If some of the samples on top or left are not available, because of the corresponding Coding Units (CUs) not being in the same slice or the current CU being at a frame boundary, then a method called reference sample substitution is performed where the missing samples are copied from the available samples in a clock-wise direction. Then, depending on the current CU size and the prediction mode, the reference samples are filtered using a specified filter.

Figure 2:
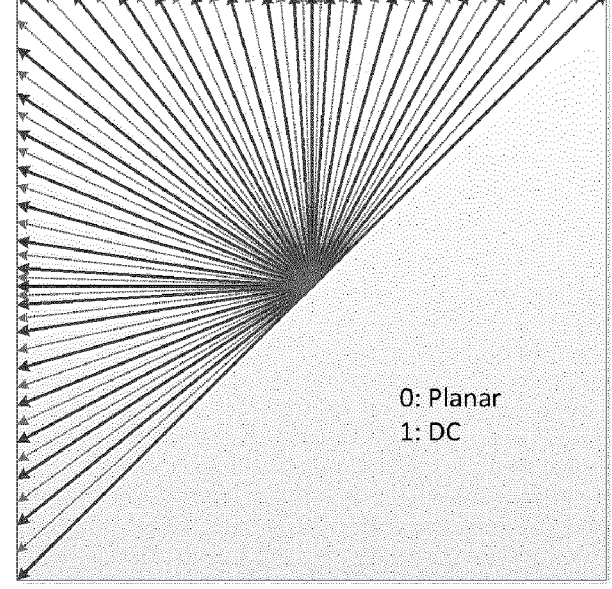
FIG. 2 shows the prediction directions for a square block in VCC.

H.266/VVC includes a range of prediction models derived from those in H.265/HEVC. Planar and DC prediction modes are used to predict smooth and gradually changing regions, whereas angular prediction modes are used to capture different directional structures. There exist 65 directional prediction modes which are organized differently for each rectangular block shape. FIG. 2 illustrates the prediction direction for square blocks in H.266/VCC. The prediction modes correspond to different prediction directions as shown on FIG. 2.

The intra prediction was further expanded with tools such as intra prediction with Multiple Reference Lines (MRL), Intra prediction with Sub-Partitions (ISP), and Matrix Intra-prediction (MIP). MIP is a set of intra prediction modes, each inferring a prediction of the current block from reconstructed pixels via a linear transformation. For 4×4 blocks, there exist 35 modes. For 4×8, 8×4, and 8×8 blocks, there are 19 modes. For the other blocks, 11 modes are used.

The intra prediction mode is signaled from the encoder to the decoder. For the luma channel, the signaling of planar, DC, and the 65 directional modes are firstly described, omitting the signaling of MRL, that of ISP, and that of MIP. These last three will be detailed thereafter. On the encoder side, the best intra prediction mode, for instance belonging to a set comprising the planar, DC, and the 65 directional modes, according to a rate-distortion criterion is selected, and its index is transmitted from the encoder to the decoder. To perform the signaling of the selected mode index via entropy coding, a list of Most Probable Modes (MPMs) is built.

Figure 3:
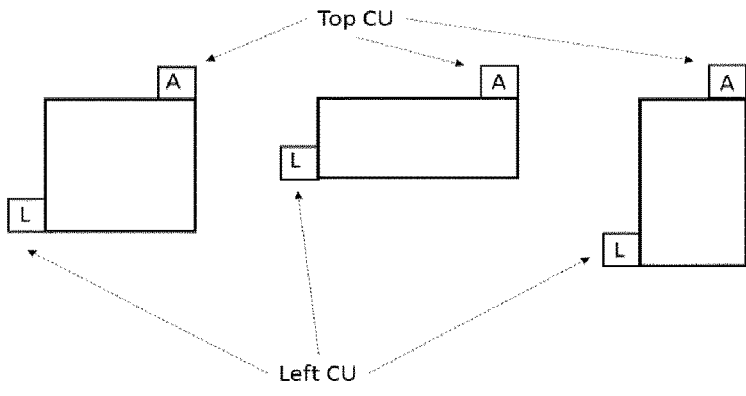
FIG. 3 shows an example of top and left CU locations for deriving an Intra MPM list for different block shapes in VVC.

In VTM, an MPM list contains 6 intra prediction modes for signaling the intra prediction mode of the current block. The MPM list is created from the prediction modes of the intra coded CUs on the top and left of the current CU and some default modes. FIG. 3 shows the top and left CUs at the right and bottom edge of the current block, used for deriving the MPM list where:

L is the prediction mode of the left CU (value in range [0-66])

A is the prediction mode of the above CU (value in rage [0-66]).

The deriving of the MPM list is as follows (with 2 variables offset=61 and mod=64):

Initialization of the MPM list:

MPM[0]=PLANAR_IDX
MPM[1]=DC_IDX
MPM[2]=VER_IDX
MPM[3]=HOR_IDX
MPM[4]=VER_IDX−4
MPM[5]=VER_IDX+4
if (L=A)
  if (L>DC_IDX)
    MPM[0]=PLANAR_IDX
    MPM[1]=L
    MPM[2]=((L+offset) % mod)+2
    MPM[3]=((L−1) % mod)+2
    MPM[4]=DC_IDX
    MPM[5]=((L+offset−1) % mod)+2
  else
    use initialized values
else
  if ((L>DC_IDX) && (A>DC_IDX))
    MPM[0]=PLANAR_IDX
    MPM[1]=L
    MPM[2]=A
    MPM[3]=DC_IDX
    MPM[4]=((max(L,A)+offset) % mod)+2 if L and A
      are not adjacent=((max(L,A)+offset−1) % mod)+
      2, otherwise
    MPM[5]=((max(L,A)−1) % mod)+2 if L and A are
      not adjacent=((max(L,A)−0) % mod)+2 otherwise

```
    else if (L+A>=2)
        MPM[0]=PLANAR_IDX
        MPM[1]=max(L,A)
        MPM[2]=DC_IDX
        MPM[3]=((max(L,A)+offset) % mod)+2
        MPM[4]=((max(L,A)−1) % mod)+2
        MPM[5]=((max(L,A)+offset−1) % mod)+2
    else
        use initialized values
```

Using circular adjacency over the range [2-66], it can be equivalently written $$((L+\text{offset}) \% \text{mod})+2\equiv L-1$$

$$((L+\text{offset}-1)\% \text{mod})+2\equiv L-2$$

$$((L-1)\% \text{mod})+2\equiv L+1$$

$$((L-0)\% \text{mod})+2\equiv L+2$$

Using the above relationships, it can be shown that the MPM list derivation is that in Table 1

TABLE 1

MPM derivation in VTM. A and L denote the predictions modes of above and left CUs respectively

| Conditions | | | MPM[0] | MPM[1] | MPM[2] | MPM[3] | MPM[4] | MPM[5] |
|---|---|---|---|---|---|---|---|---|
| L = A | L ≠ PLANAR_IDX and L ≠ DC_IDX | | PLANAR_IDX | L | L − 1 | L + 1 | DC_IDX | L − 2 |
| | otherwise | | PLANAR_IDX | DC_IDX | VER_IDX | HOR_IDX | VER_IDX − 4 | VER_IDX + 4 |
| L ≠ A | L > DC_IDX and A > DC_IDX | | PLANAR_IDX | L | A | DC_IDX | max(L, A) − 2, if L and A are adjacent else max(L, A) − 1 | max(L, A) + 2, if L and A are adjacent else max(L, A) + 1 |
| | otherwise | L + A >= 2 | PLANAR_IDX | max(L, A) | DC_IDX | max(L, A) − 1 | max(L, A) + 1 | max(L, A) − 2 |
| | | otherwise | PLANAR_IDX | DC_IDX | VER_IDX | HOR_IDX | VER_IDX − 4 | VER_IDX + 4 |

If the selected intra prediction mode for predicting the current block corresponds to one of the six MPM modes, this is signaled via the mpmFlag with value 1 and then by signaling the candidate mode from the MPM list using the variable length coding scheme shown in Table 2. Otherwise, the mpmFlag is equal to 0 and the candidate index in the set of remaining 61 modes is truncated binary encoded with either 5 or 6 bits.

TABLE 2

MPM signaling in VTM

| Candidate Index | Code |
|---|---|
| MPM[0] | 0 |
| MPM[1] | 10 |
| MPM[2] | 110 |
| MPM[3] | 1110 |
| MPM[4] | 11110 |
| MPM[5] | 11111 |

For intra prediction with MRL, the reference line used for the prediction is signaled with a flag multiRefIdx. The valid values of multiRefIdx are 0, 1, and 3, which signal the first reference line, the second reference line, and the fourth reference line respectively. When multiRefIdx is non-zero, meaning either the second or the fourth reference line is used, the prediction mode always belongs to the MPM list. Thus, the mpmFlag is not signaled. Furthermore, planar is excluded from the list. This means that, when multiRefIdx is non-zero, only five prediction modes are available as possible candidates. When multiRefIdx is non-zero, the prediction mode is signaled as shown in Table 3.

TABLE 3

MPM signaling when multiRefIdx >0 in VTM

| Candidate index | Code |
|---|---|
| MPM[1] | 0 |
| MPM[2] | 10 |
| MPM[3] | 110 |
| MPM[4] | 1110 |
| MPM[5] | 1111 |

For ISP, the type of partitioning used for the CU is signaled with a flag called ispMode. ispMode is encoded only when multiRefIdx is equal to 0. The valid values of ispMode are 0, 1, and 2, which signal no partitioning, horizontal partitioning, and vertical partitioning respectively. Now regarding MIP, a MIP mode is first signaled with a flag called mipFlag, a value of 1 meaning that a MIP mode is used for predicting the current block, and 0 meaning that one of the 67 intra prediction modes is used. When mipFlag is equal to 1, multiRefIdx is necessarily equal to 0, meaning that the first reference line is used, and ispMode is equal to 0, i.e. there is no target CU partition. Therefore, when mipFlag is equal to 1, multiRefIdx and ispMode are not written to the bitstream. If mipFlag is equal to 1, the index of the selected MIP mode is then truncated binary encoded in the latest versions of VTM.

To handle the case where the intra prediction mode for predicting the current block is one of the 67 intra prediction modes and the selected mode for predicting the top CU or the one for predicting the left CU is a MIP mode, a mapping between each MIP mode and one of the conventional modes enables to substitute this MIP mode with its mapped conventional mode, in the latest versions of VTM, any MIP mode is mapped to planar.

Figure 4:
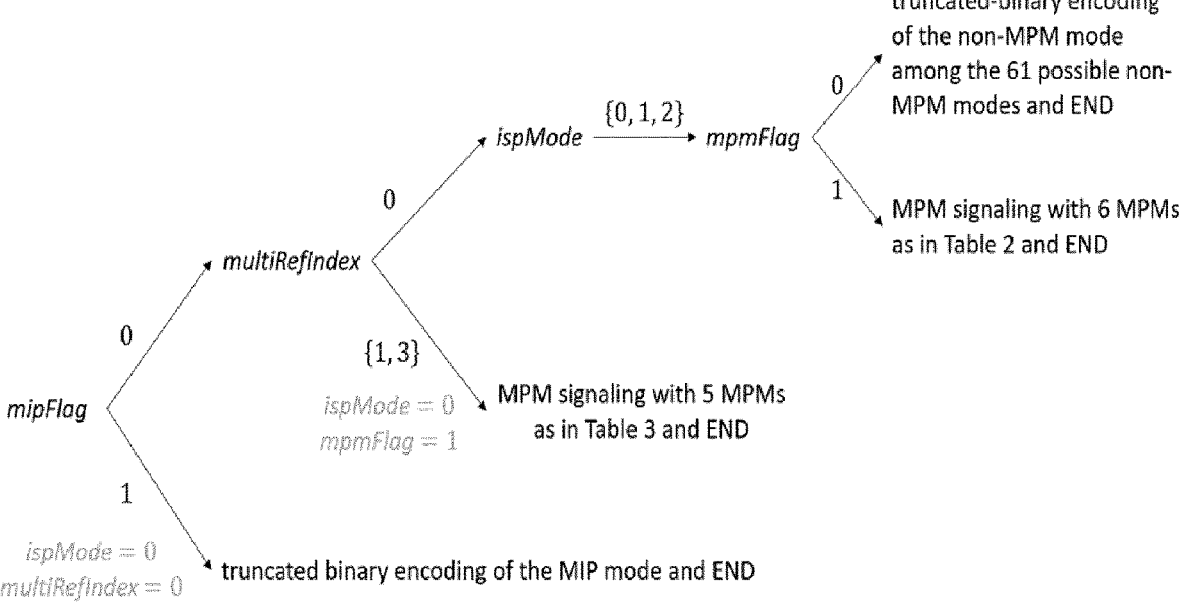
FIG. 4 represents a decision tree illustrating the intra prediction signaling for luma in VVC.

FIG. 4 represents a decision tree illustrating the intra prediction signaling for luma in VVC. In FIG. 4, a flag in light gray indicates that the value of the flag is deduced from the value of the previous flags written to the bitstream on the encoder side and read from the bitstream on the decoder side. This means that the flags in light gray are not written to the bitstream on the encoder side; they are not read from the bitstream on the decoder side.

It is essential to mention that some flags are CU-level whereas the others are PU-level. For a CU-level flag, the value of the flag applies to the PU(s) in the CU. For a PU-level flag, each PU in the CU has its own flag value. If a flag is PU-level, in FIG. 4, when the decision tree reaches the binary decision associated to this flag, the value of this flag for each PU is written to the bitstream before moving on to the subsequent binary decision. Table 4 shows the level of each flag represented in FIG. 4.

TABLE 4

| level of each flag involved in the intra prediction signaling in VTM | |
| --- | --- |
| Flag | Level |
| mipFlag | CU |
| multiRefIndex | PU |
| ispMode | CU |
| mpmFlag | PU |

For the two chroma channels, neither MRL nor ISP nor MIP is used. However, two specific tools are used: the direct mode and Cross-Component Linear Model (CCLM).

Figure 5:
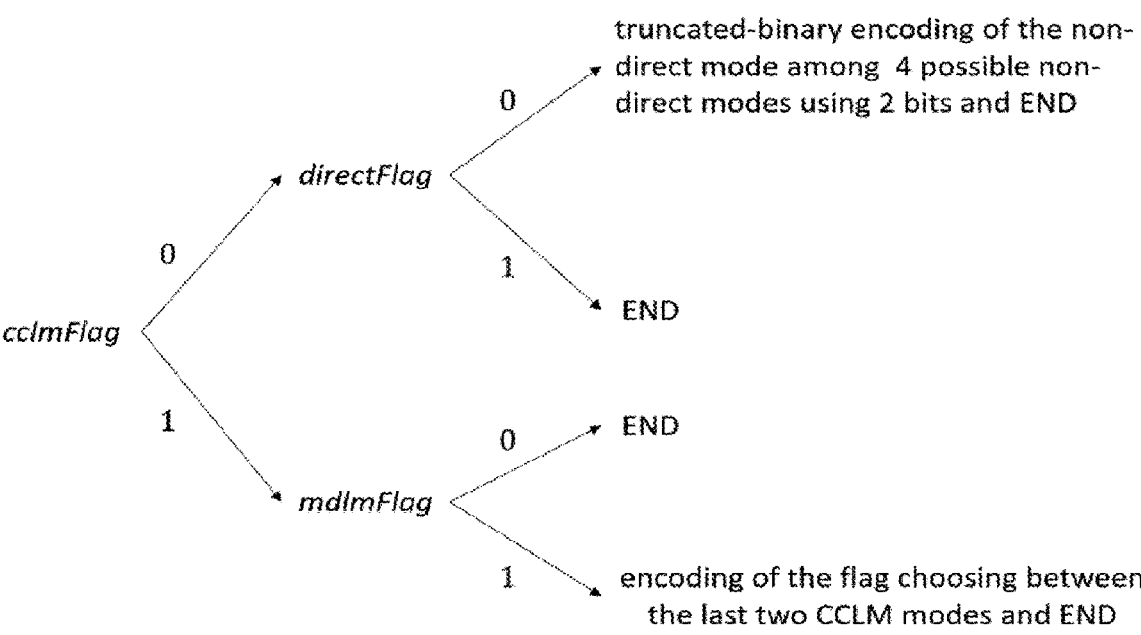
FIG. 5 represents a decision tree illustrating the intra prediction signaling for chroma in VVC.

FIG. 5 represents a decision tree illustrating the intra prediction signaling for chroma in WVC. The direct mode corresponds to the application of the selected mode for predicting the collocated luma block to the prediction of the current chroma block. If the directFlag is equal to 1, the direct mode is selected for predicting the current chroma block. Otherwise, the directFlag is equal to 0, and one mode in the list L=[planar, vertical, horizontal, DC] is selected. If a mode in L is equal to the direct mode, this mode is replaced by the mode of index 66. In CCLM, a linear model predicts the current chroma block from the reconstructed luma reference samples surrounding the collocated luma block. The parameters of the linear model are derived from the reconstructed reference samples. There exist three CCLM modes, each associated to a different derivation of the parameters. If the cclmFlag is equal to 1, one of the three CCLM mode is selected. In this case, the directFlag is not written to the bitstream. Otherwise, the cclmFlag is equal to 0, and either the direct mode or one of the modes in L is selected.

Figure 6A:
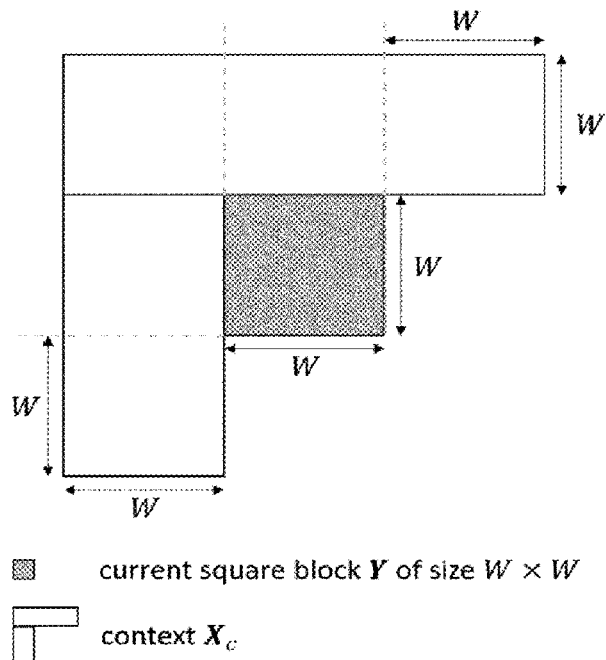
FIG. 6a illustrates an example of context surrounding the current block to be predicted using neural network.

As previously explained, recent video codec introduces neural network-based intra prediction. A deep intra predictor infers a prediction from the context surrounding the current block to be predicted. FIG. 6a illustrates an example of context surrounding a current block to be predicted using neural network. The context $X_c$ is composed of reconstructed pixels on top and top-right of the current block Y and on its left side and below-left side, similarly to the set of reconstructed reference samples for the intra prediction in H.266/VVC. But, unlike it, the context $X_c$ is extended towards the left and the top as shown on FIG. 6a. Thanks to this extension, the deep intra predictor can learn a relationship between the spatial correlations in its input context and the prediction it gives. Note that the subscript "c" in $X_c$ indicates that the reconstructed pixels in the context have already been preprocessed, as detailed later.

FIG. 6b illustrates an example of intra prediction via a fully-connected neural network in which various aspects of the embodiments may be implemented. If the deep intra predictor is fully-connected, the context is typically flattened into a vector, and the resulting vector is fed into the neural network. Then, the vector provided by the neural network is reshaped to the shape of the current block, yielding the prediction $\hat{Y}_c$ as shown on FIG. 6b. Note that the subscript "c" in $\hat{Y}_c$ indicates that the predicted pixels have not been post-processed yet, which will be explained later.

FIG. 6c illustrates an example of intra prediction via a convolutional neural network in which various aspects of the embodiments may be implemented. If the deep intra predictor is convolutional, the context can be split into two portions. Then, each portion is fed into a stack of convolutional layers. The two stacks of feature maps at the output of the two stacks of convolutional layers are merged via full connectivity. Finally, the result of the merge is inserted into a stack of transpose convolutional layers, yielding the prediction $\hat{Y}_c$. During the preprocessing step, the context $X_c$ can be obtained by subtracting from the original context X of reconstructed pixels its mean pixel intensity $\alpha$, $$X_c = X - \alpha$$

Then, during the post-processing step, the post-processed prediction $\hat{Y}$ of the current block Y is computed by adding to the prediction $\hat{Y}_c$ the mean pixel intensity and clipping, $$\hat{Y} = \min(\max(\hat{Y}_c + \alpha, 0), (1 << b) - 1)$$

b denotes the pixel bit depth. As an alternative, $\alpha$ can also be the mean pixel intensity over a large set of training images.

In video codecs such as H.265/HEVC and H.266/VVC, the image is split into Coding Tree Units (CTUs). The CTUs are processed one at a time, in raster-scan order. Each CTU can be split hierarchically into Coding Units (CUs). The CUs in a CTU are processed in Z-scan order. Consequently, in H.265/HEVC for instance, the size of a block to be predicted can be either 64×64, 32×32, 16×16, 8×8 or 4×4. This means that 5 neural networks are needed, one for each size of block to be predicted. The deep intra predictor mode is thus made of the 5 neural networks. In H.266/VVC, as the hierarchical splitting is more sophisticated, a block to be predicted can be of size either 128×128, 64×64, 32×32, 16×16, 8×8 or 4×4. Besides, it can also be rectangular, e.g. of size 4×8. In this case, a solution is to assign one neural network per block size to build the deep neural network mode.

In the different works integrating a deep intra prediction mode into a video codec, usually H.265/HEVC, the deep intra prediction mode is systematically in competition with the existing ones. For the current block to be predicted, a flag is written to the bitstream before all the other flags for intra prediction. The value 1 indicates that the deep intra prediction mode is selected for predicting the current block. In this case, no other flag for intra prediction is written to the bitstream. The value 0 means that one of the regular intra prediction is selected. In this case, the regular flags for intra prediction are then written to the bitstream.

Note that, the above-mentioned signaling has been implemented in H.265/HEVC. No approach has been proposed yet in H.266/VVC. Notably, it is not clear yet how to handle the flags mipFlag, multiRefIdx, and ispMode when the deep neural network mode is selected.

According to at least one generic embodiment of the present principles, instead of having a deep neural network mode competing with the existing intra prediction modes, the deep neural network mode alone takes over the intra prediction component of the video codec. According to a particular feature, the deep neural networks generates side information which is transmitted from the encoder to the decoder. According to another particular feature, on the decoder side, the deep intra predictor infers a prediction of the current block from the context surrounding the current block to be predicted and the side information.

Figure 7:
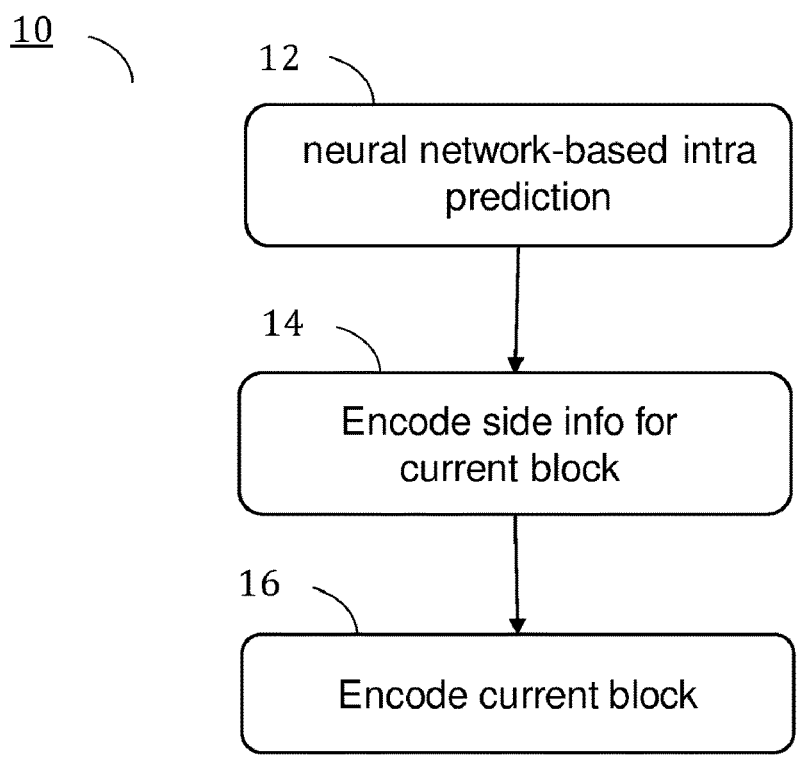
FIG. 7 illustrates a generic encoding method according to at least one embodiment.

FIG. 7 illustrates a generic encoding method according to at least one embodiment. As detailed hereafter with the various implementations, the encoding method 10 comprises, once the picture of a video is partitioned into block to encode, determining 12 a neural network intra prediction and side information using a neural network from at least one input data. At the encoding, the neural network uses as input not only the context surrounding the block being encoded, but also to the block itself. Then, based on the neural network intra prediction, the block is encoded 16 wherein the encoding further comprises, as non-limiting examples of steps, obtaining a block of residuals that is then transformed and quantized. In a step 14, the side information of the intra prediction neural network is also encoded and transmitted to the decoder thus advantageously allowing the decoder to avoid the "failure case" in the neural network intra prediction. Steps 14 and 16 are performed in any order or in parallel.

Figure 8:
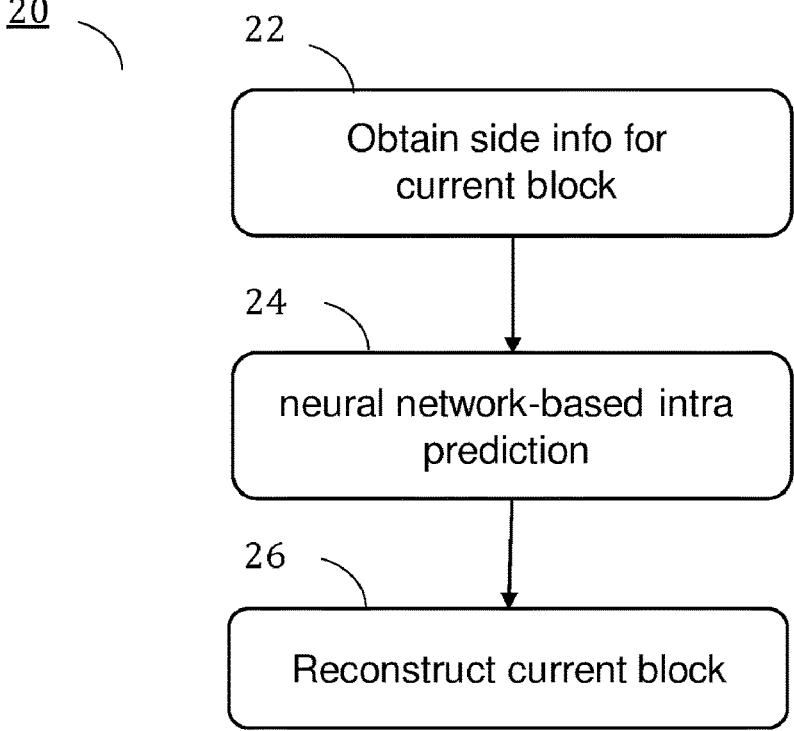
FIG. 8 illustrates a generic decoding method according to at least one embodiment.

FIG. 8 illustrates a generic decoding method according to at least one embodiment. As detailed hereafter with the various implementations, the decoding method 20 comprises, obtaining 22, for a block being decoded in a picture of a video, a side information for a neural network intra prediction. According to a non-limiting example, the side information is received and decoded using optionally transform and quantization as block data. Then, in a step 24, a neural network intra prediction is determined using a neural network which uses as input the side information along with other input data, such as, the context surrounding the block being decoded wherein the context comprises available pixels being previously reconstructed in the video picture. As with classic decoding method, the block is reconstructed 26 based on the neural network intra prediction.

Figure 9:
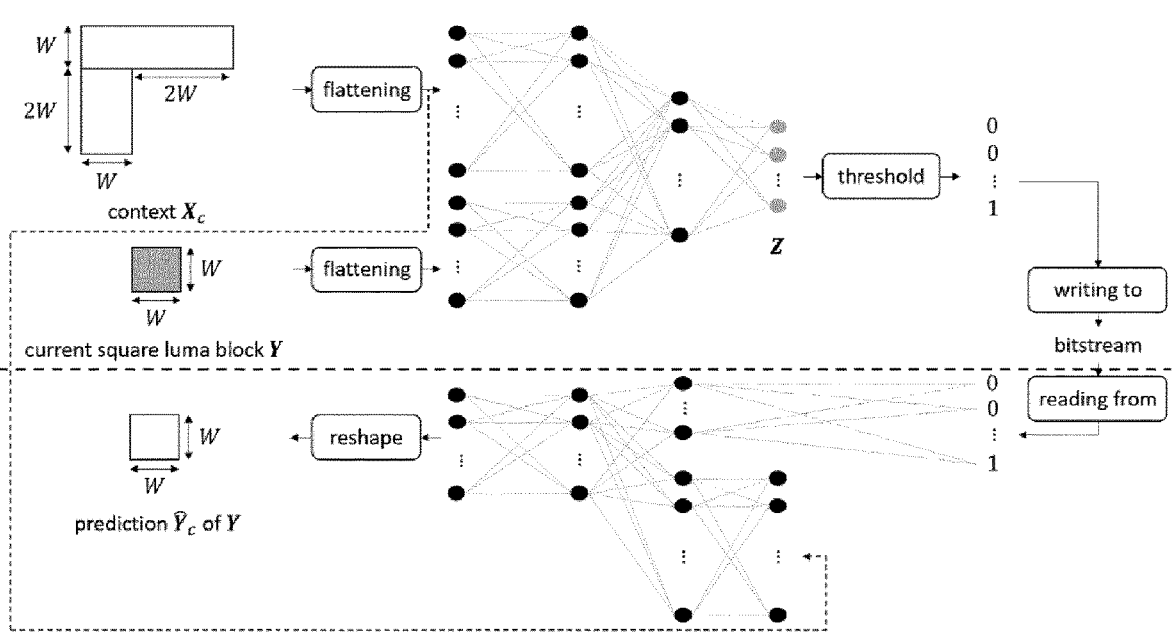
FIGS. 9, 10, 12, 13, 14, 15, 16, 17, 18 illustrate different variants of a neural network-based intra prediction method with side information in a video encoder and in a video decoder according to at least one embodiment.
Figure 10:
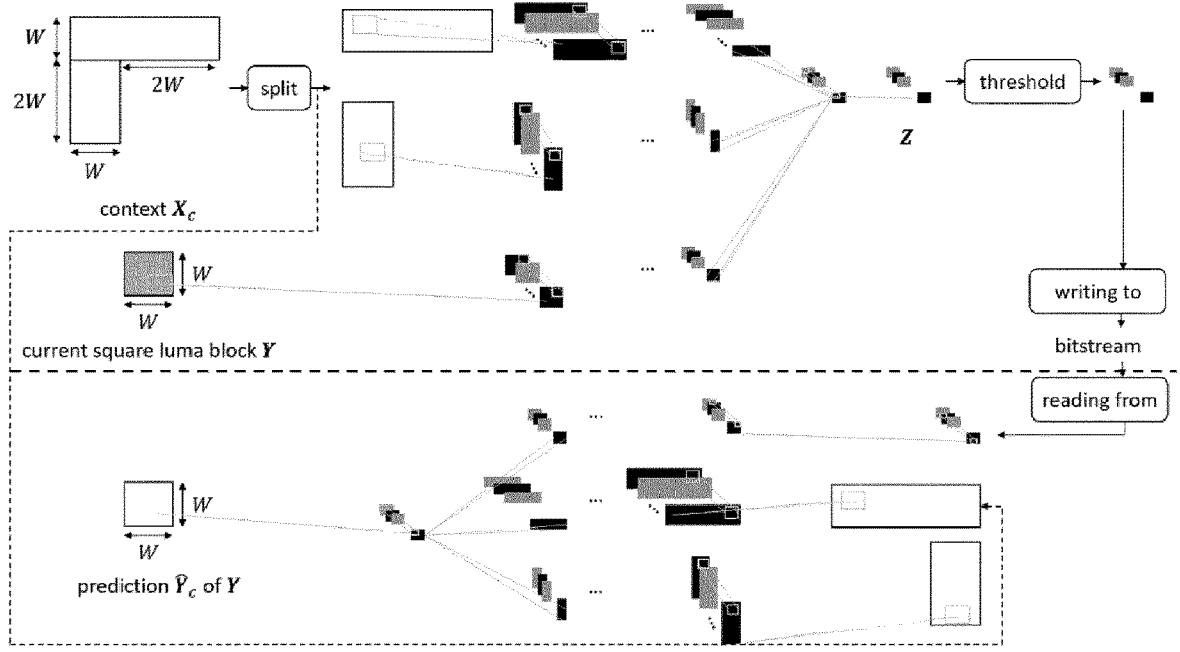

In the following different variants of a neural network-based intra prediction method based on side information in a video encoder and in a video decoder according to at least one embodiment is presented. Accordingly, different variants of the encoding method of FIG. 7 and decoding method of FIG. 8 are thus illustrated in the following. The neural network architecture is split into two parts: an encoder part and a decoder part. In the encoder part, the neural network has access not only to the context $X_c$ surrounding the current luma block Y, but also to Y. That is why the encoder architecture takes them as input to generate side information. The side information is written to the bitstream. In the decoder part, the neural network takes the side information read from the bitstream and the context $X_c$ to provide a prediction $\hat{Y}_c$ of the current luma block. FIG. 9 and FIG. 10 illustrate two non-limiting examples of instantiations of the above-mentioned proposition for fully-connected and convolutional architectures respectively. In both cases, the last layer of the encoder architecture contains the sigmoid non-linearity.

FIG. 9 illustrates deep intra predictor generating side information with fully-connected architecture for predicting luma blocks. The horizontal dashed line delineates the encoder and decoder parts of the architecture. The broken dashed line crosses the frontier between the encoder side and the decoder side as the context is available on both sides. For the fully-connected architecture, the side information is thus a vector Z whose coefficients belong to [0, 1]. By applying an elementwise threshold of 0.5 to Z, this vector is converted into a vector of bits, which is written to the bitstream.

Figure 11:
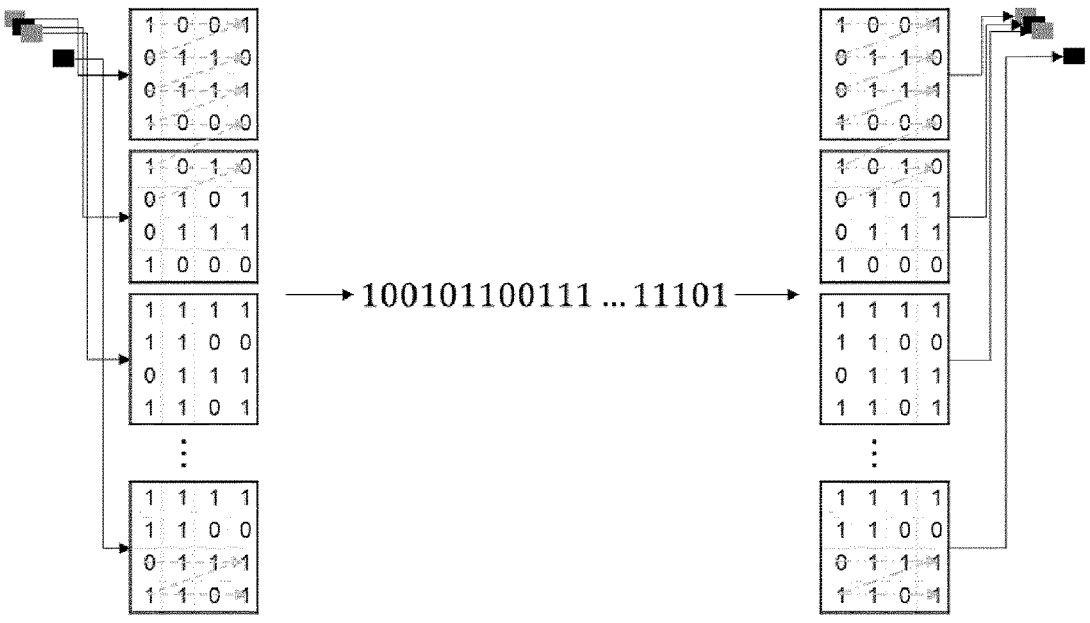
FIG. 11 illustrates a non-limiting example of the conversion operation of the stack of feature maps of bits into a bitstream according to at least one embodiment.

FIG. 10 illustrates a deep intra predictor generating side information with convolutional architecture for predicting luma blocks. The horizontal dashed line delineates the encoder and decoder parts of the architecture. The broken dashed line crosses the frontier between the encoder side and the decoder side as the context is available on both sides. For the convolutional architecture, Z is a stack of feature maps whose coefficients belong to [0, 1]. The same threshold enables to convert it into a stack of feature maps of bits, which is written to the bitstream in raster-scan order. FIG. 11 illustrates a non-limiting example of the conversion operation of the stack of feature maps of bits into a bitstream wherein the bits are written into or read from the bitstream in raster scan order. In this case, on the decoder side, as the bitstream is read, the stack of feature maps of bits is reconstructed in raster-scan order.

Figure 12:
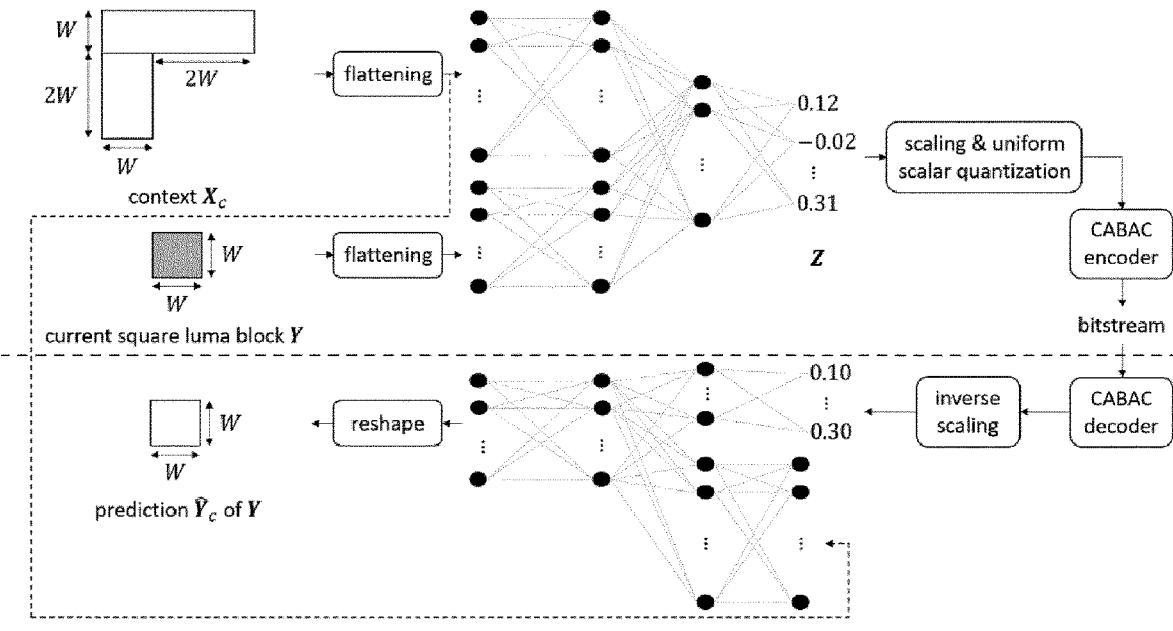
Figure 13:
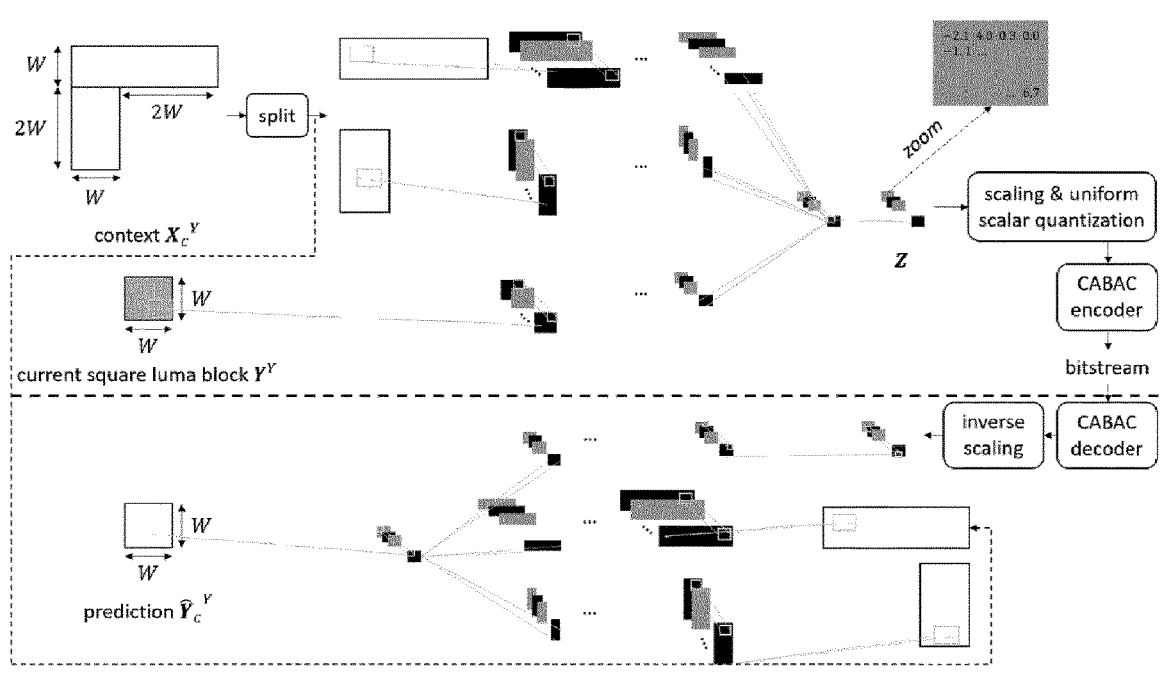

According to a first variant, the values of the output vector Z are unrestricted and belong to $\mathbb{R}$. FIG. 12 illustrates an example of deep intra predictor generating side information with fully-connected architecture in the case of the first variant. FIG. 13 illustrates an example of deep intra predictor generating side information with convolutional architecture in the case of the first variant. In this variant, the sigmoid non-linearity is removed from the last layer of the encoder part of the deep intra predictor generating side information. As this layer has no non-linearity, the coefficients in its output Z belong to $\mathbb{R}$. As for the transform coefficients in H.265/HEVC and H.266/VVC, the coefficients in Z are quantized via a uniform scalar quantization as shown on FIGS. 12 and 13. Then, the sign of each quantized coefficient is encoded losslessly and the absolute value is encoded losslessly via binary arithmetic coding. A CABAC context model can be used for the binary arithmetic coding of the absolute value of the quantized coefficients.

According to a second variant, the values of the output vector Z are binarized and belong to [−1, 1]. In this second variant, the sigmoid non-linearity in the last layer of the encoder part of the architecture is replaced by a tangent-hyperbolic non-linearity. The coefficients in its output Z thus belong to [−1, 1]. According to yet another second variant, the output vector is converted into a vector of bits by applying an element wise threshold of 0.5 to the vector. In this case, an elementwise threshold at 0 is applied to Z, yielding a vector of coefficients in {−1, 1} for the fully-connected architecture and a stack of feature maps whose coefficients belong to {−1, 1} for the convolutional architecture. When writing to the bitstream and reading from it, each coefficient equal to −1 is mapped to 0 and conversely.

Figure 14:
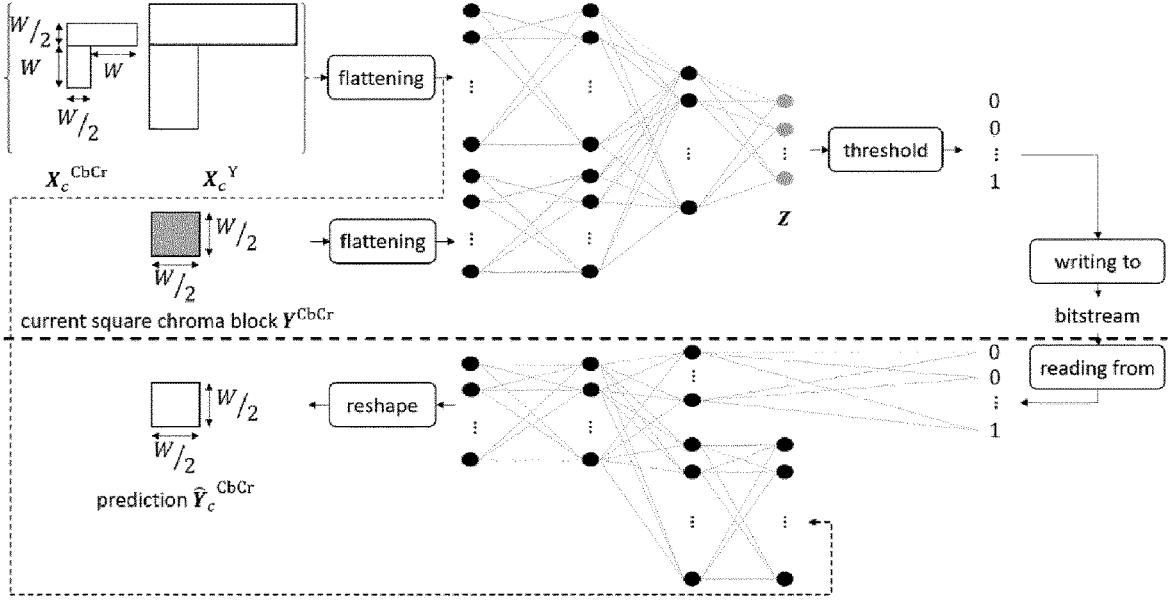
Figure 15:
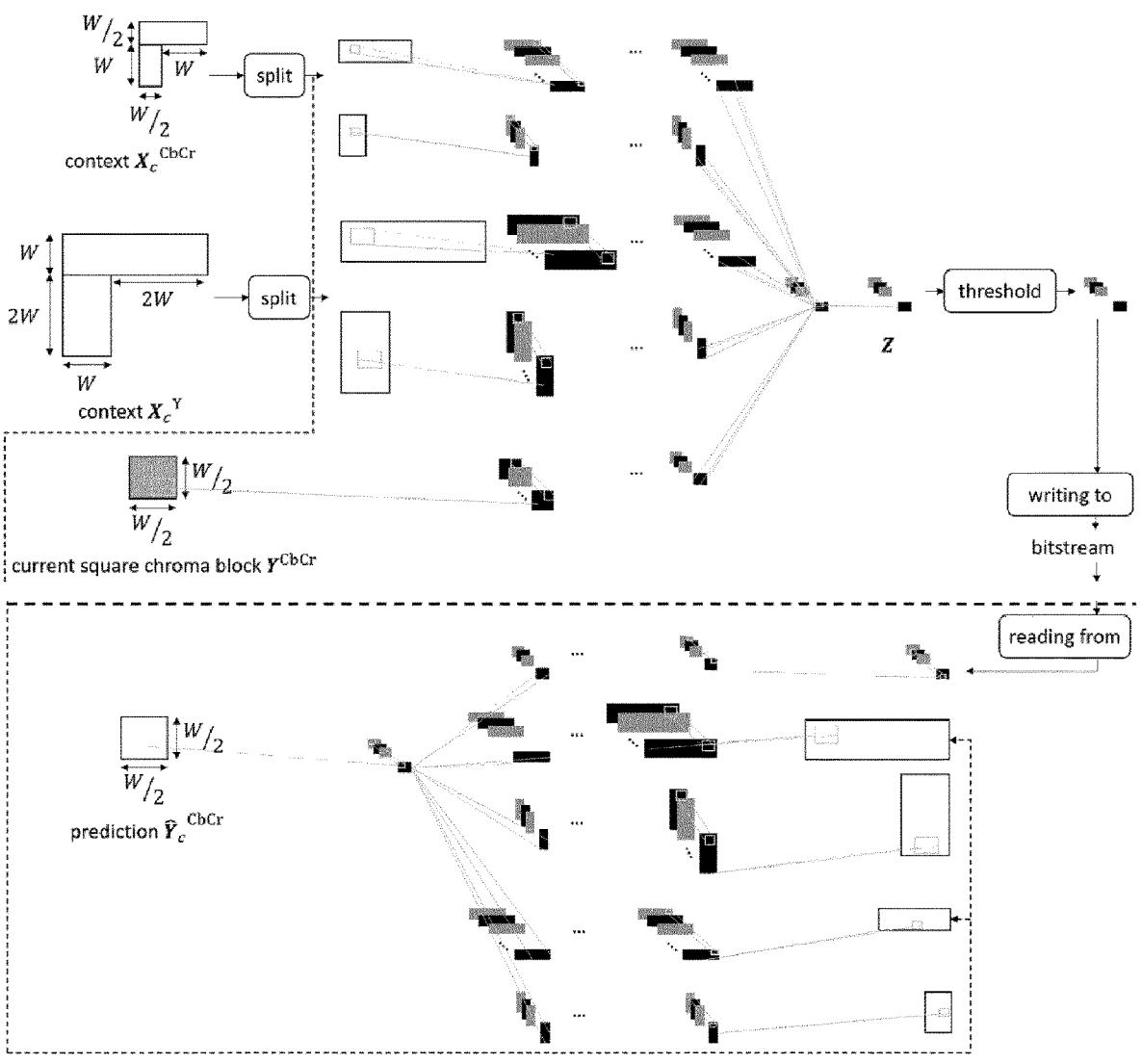

FIG. 14 illustrates a deep intra predictor generating side information with fully-connected architecture for predicting chroma blocks. FIG. 15 illustrates a deep intra predictor generating side information with convolutional architecture for predicting chroma blocks. The notations are the same as for the previous embodiments. The encoder part of the deep neural network is fed with the context $$X_c^{CbCr}$$

surrounding the current chroma block $Y^{CbCr}$, the context $$X_c^Y$$

surrounding the luma block $Y^Y$ that is collocated with the current chroma block, and the current chroma block $Y^{CbCr}$, to generate side information. The decoder part of the deep neural network takes the side information read from the bitstream, $$X_c^{CbCr}, \text{ and } X_c^Y$$

to provide a prediction $$\hat{Y}_c^{CbCr}$$

of $Y^{CbCr}$. The adaptation of FIG. 9 to the case of a given chroma block to be predicted in 4:2:0 is shown in FIG. 14. The adaptation of FIG. 10 to the case of a given chroma block to be predicted in 4:2:0 is depicted in FIG. 15.

According to a first variant of the prediction of chroma blocks, the prediction of the chroma blocks relies on the luma context exclusively. In the first variant, only the context $$X_c^Y$$

surrounding the luma block $Y^Y$ that is collocated with the current chroma block and the current chroma block $Y^{CbCr}$ are fed into the encoder part of the deep neural network. The decoder part of the deep neural network takes the side information read from the bitstream and $$X_c^Y$$

to give a prediction $$\hat{Y}_c^{CbCr}$$

of $Y^{CbCr}$.

Figure 16:
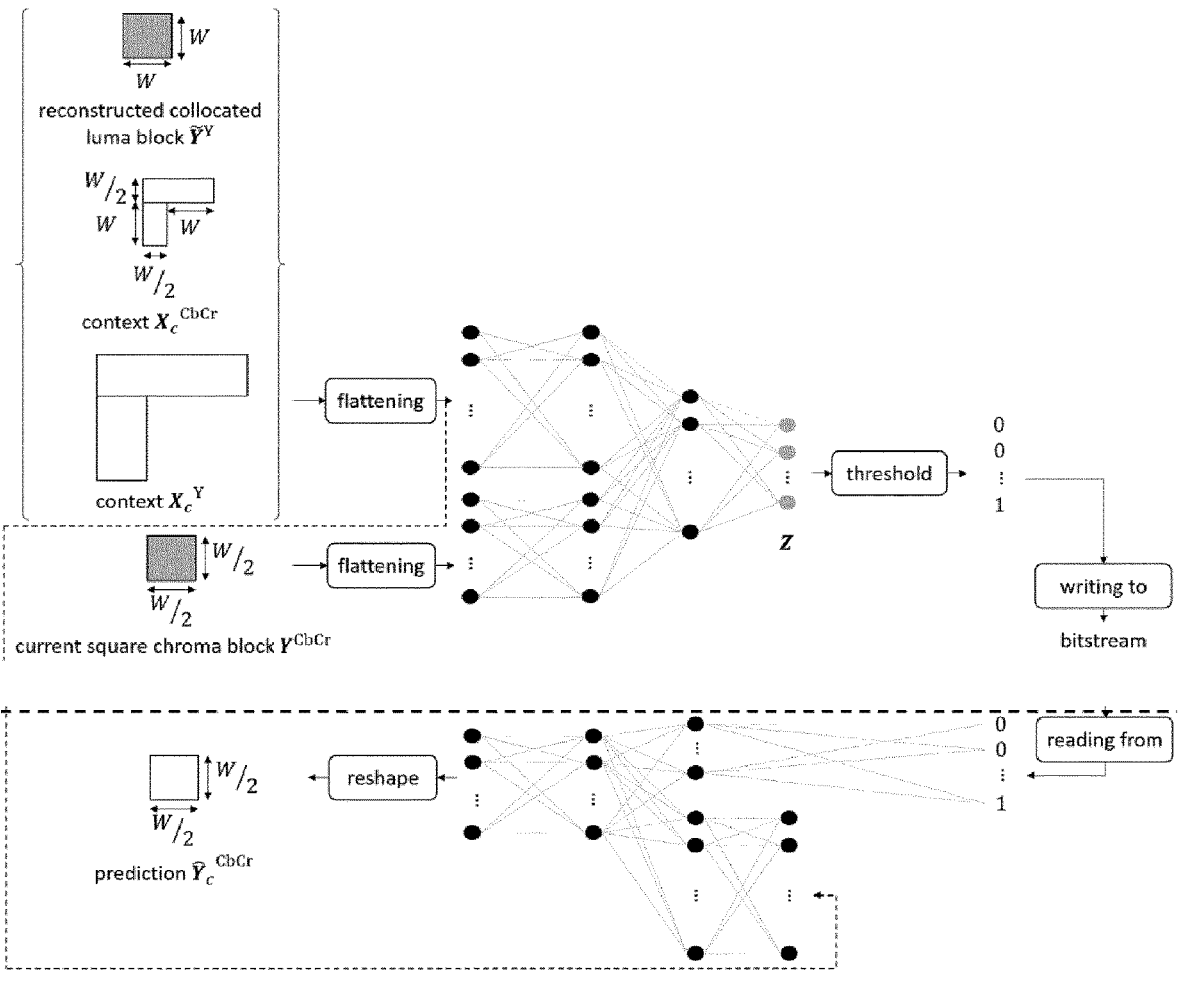

According to a second variant of the prediction of chroma blocks, the prediction of the chroma blocks relies on reconstructed luma block. When predicting the current chroma block, the luma block that is collocated with the current chroma block is already encoded and decoded. FIG. 16 illustrates an example of a deep intra predictor generating side information with fully-connected architecture for predicting the current chroma block when the reconstruction of the luma block that is collocated with the current chroma block is fed into the deep intra predictor on both the encoder and decoder sides. In this second variant, the encoder part of the deep intra predictor takes the context $$X_c^{CbCr}$$

surrounding the current chroma block, the context $$X_c^Y$$

surrounding the luma block that is collocated with the current chroma block, the current chroma block $Y^{CbCr}$, and the reconstruction $\tilde{Y}^Y$ of this luma block to generate side information. The decoder part of the deep neural network takes the side information read from the bitstream, $$X_c^{CbCr}, X_c^Y,$$

and $\tilde{Y}^Y$ to provide a prediction $$\hat{Y}_c^{CbCr}$$

of $Y^{CbCr}$.

According to yet another variant, the intra prediction modes of the top and left CUs is also used as input data for predicting luma blocks or chroma blocks. In this variant, the intra prediction mode (L) of the block located on the left side of the block being encoded or decoded and the intra prediction mode (A) of the block located above the block being encoded or decoded are used as input data to the neural network. It is possible to insert into the architectures presented in FIGS. 9 and 10, the intra prediction mode of the CU located on the left side of the current CU and the intra prediction mode of the CU located above the current CU, which are denoted L and A in FIG. 3.

Figure 17:
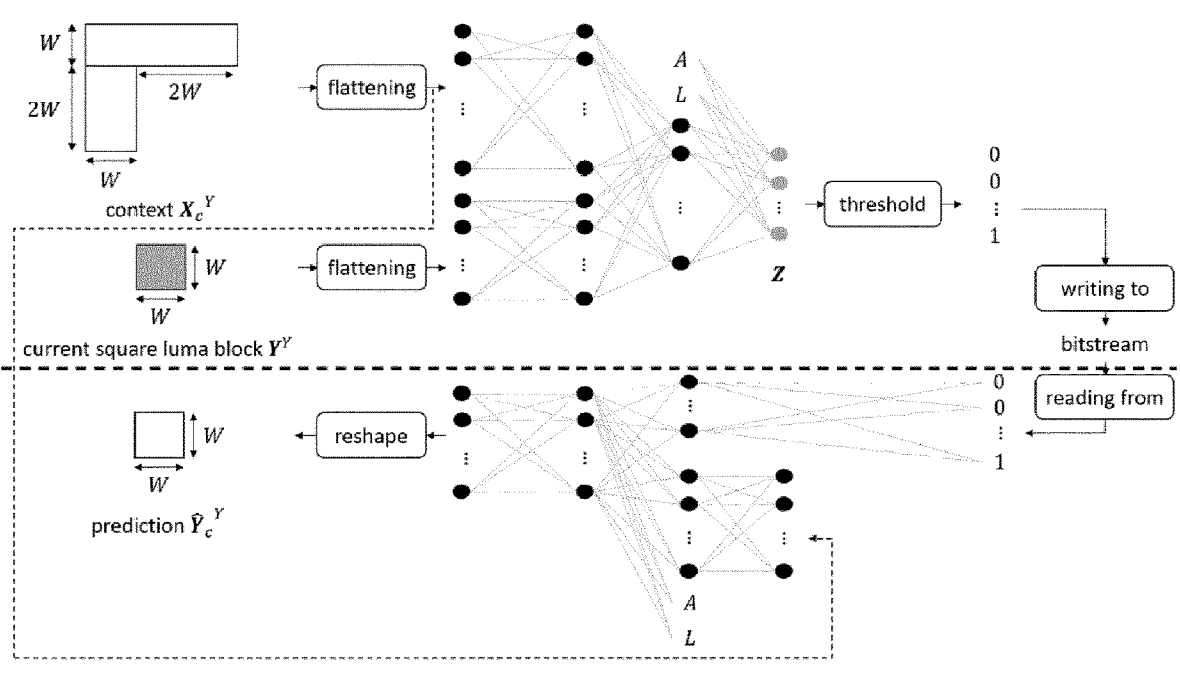

FIG. 17 illustrates an example of a deep intra predictor generating side information with fully-connected architecture for predicting luma blocks when the intra prediction mode of the CU located on the left side of the current CU and the intra prediction mode of the CU located above the current CU are fed into the deep intra predictor.

Figure 18:
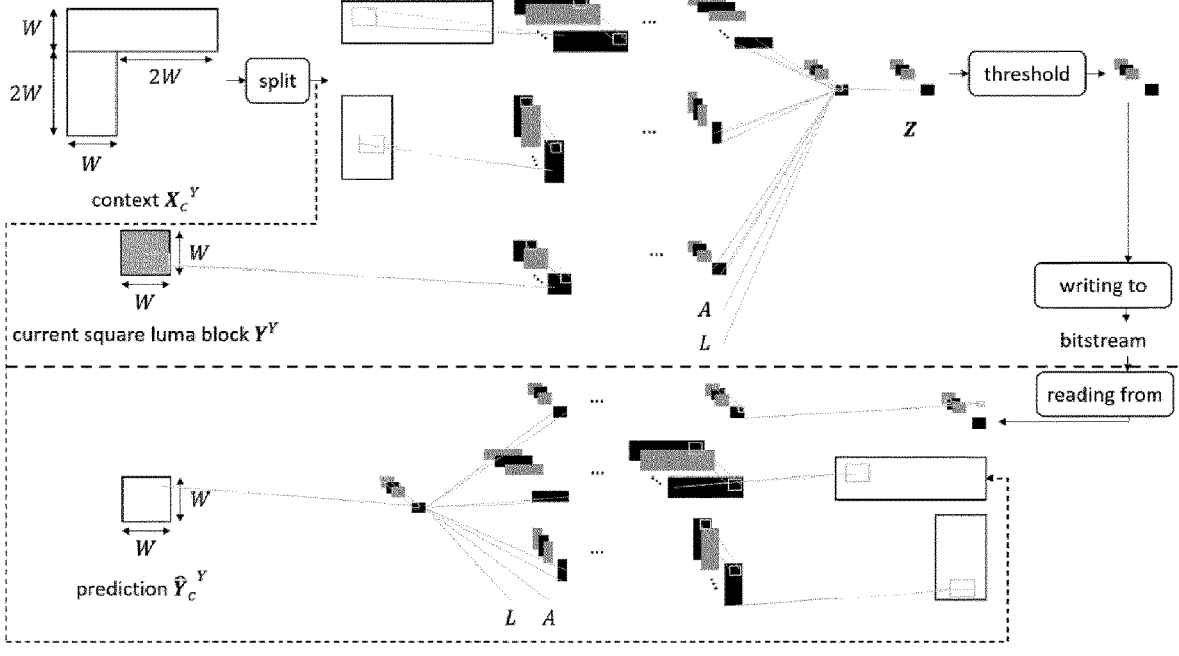

FIG. 18 illustrates an example of a deep intra predictor generating side information with convolutional architecture for predicting luma blocks when the intra prediction mode of the CU located on the left side of the current CU and the intra prediction mode of the CU located above the current CU are fed into the deep intra predictor.

These two intra prediction modes L and A are fed into the architectures on both the encoder and decoder sides. This way, on the encoder side, the deep neural network can generate more compressible side information by removing from it some redundancies between the side information it is computing and {A, L}.

According to yet another advantageous characteristic, the enabling/disabling of a deep intra predictor generating side information is signaled from the encoder to the decoder. As the deep intra predictor generating side information advantageously allows to handle alone the intra prediction, it replaces the 67 intra prediction modes, MRL, ISP, and MIP. This implies that, on the encoder side, there is no more selection of the best intra prediction mode according to a rate-distortion criterion. In this variant, the prediction is always determined according to the deep intra prediction mode. At a given step of the hierarchical partitioning in H.266/VVC, for a given luma block to be predicted, the deep intra predictor is systematically selected for predicting the current luma block. The signaling cost of intra prediction comes from the side information the deep intra predictor generates exclusively.

Figure 19:
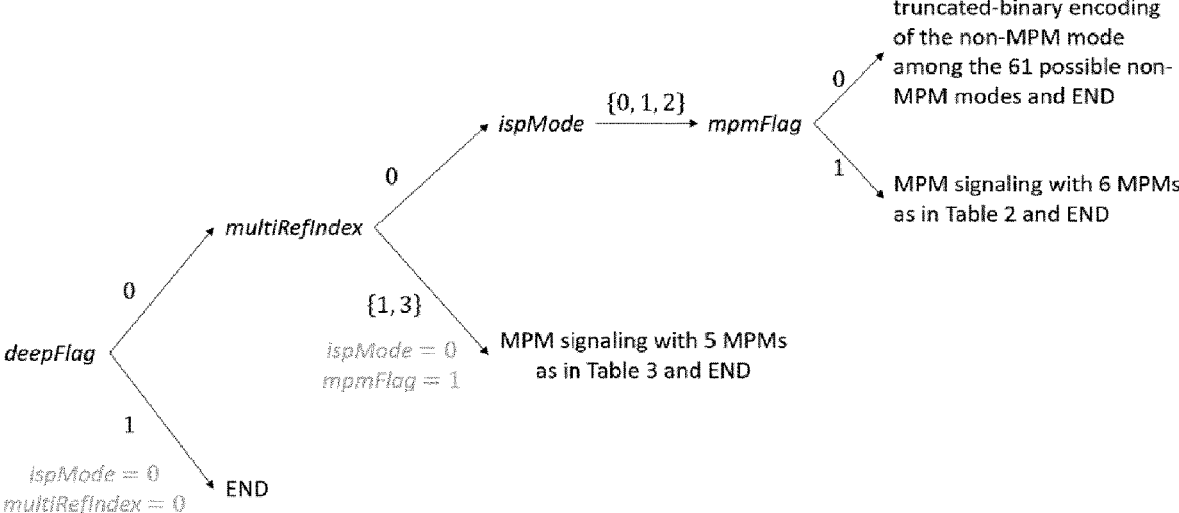
FIGS. 19 and 20 illustrate different variants of a decision tree illustrating the intra prediction signaling according to at least one embodiment.

In a first variant of the above approach, the deep intra prediction mode is still in competition with intra prediction modes in H.266/VVC. It replaces MIP in H.266/VVC. This means that MIP is suppressed and the mipFlag becomes the deepFlag. FIG. 19 illustrates a non-limiting example of a decision tree illustrating the intra prediction signaling according to at least one embodiment. If the deepFlag is equal to 1, the deep intra predictor is selected for predicting the current luma block. Otherwise, the deepFlag is equal to 0, and one of the 67 intra prediction modes is used. When the deepFlag is equal to 1, multiRefIdx is necessarily equal to 0, meaning that the first reference line is used, and ispMode is equal to 0, i.e. there is no target CU partition. Therefore, when the deepFlag is equal to 1, multiRefIdx and ispMode are not written to the bitstream. The deepFlag has a CABAC context model with two neighbors: the intra prediction mode selected for predicting the left PU and the intra prediction mode for selecting the above PU. FIG. 19 summarizes the sequence of decisions for the intra prediction signaling via the decision tree. Here, the deepFlag is CU-level.

Figure 20:
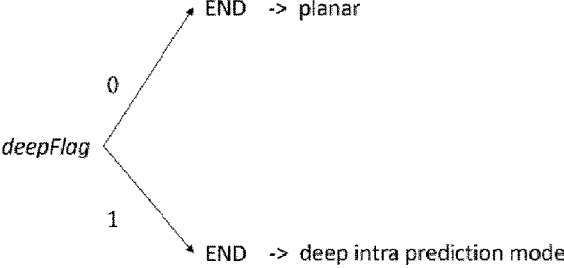

In a second variant of the above approach, the intra prediction in H.266/VVC is based on the deep intra predictor and planar exclusively. FIG. 20 illustrates a non-limiting example of a decision tree illustrating the intra prediction signaling according to this variant. This time, the rate-distortion optimization is kept, but its candidates are limited to planar and the deep intra prediction mode. During the rate-distortion optimization, the fast pass is suppressed, meaning that the two candidates are systematically tested for the current luma block to be predicted. The deepFlag is written to the bitstream to indicate the selection of the deep intra prediction mode for predicting the current luma block. If the deepFlag is equal 1, the deep intra predictor is selected. Then, the side information it generates is written to the bitstream. Otherwise, planar is selected as shown on FIG. 20. Note that, in this second variant, MRL and ISP are removed. As with the first variant, the deepFlag has a CABAC context model with two neighbors.

As for luma, as the deep intra predictor generating side information advantageously allows to handle alone the intra prediction, it replaces CCLM, the direct mode, and the four other modes. At a given step of the hierarchical partitioning in H.266/VVC, for a given chroma block to be predicted, the deep intra predictor is systematically selected for predicting the current chroma block. The signaling cost of intra prediction comes from the side information the deep intra predictor generates exclusively.

In a first variant, the deep intra prediction mode is still in competition with the other tools for chroma intra prediction in H.266/VVC. The intra prediction signaling for chroma is the one in FIG. 5. In the list of four modes for chroma prediction L, the horizontal mode is replaced by the deep neural network mode. If the direct mode is equal to one of the four modes in L, this mode is replaced by the horizontal mode.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 21:
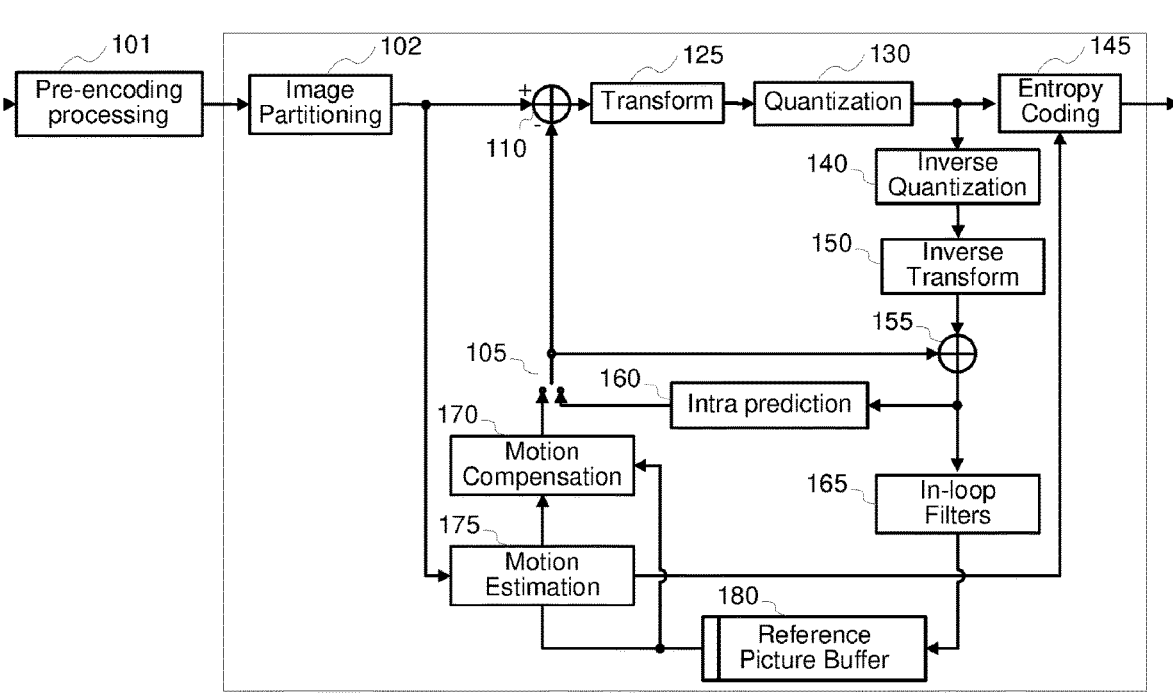
FIG. 21 illustrates a block diagram of an embodiment of video encoder in which various aspects of the embodiments may be implemented.
Figure 22:
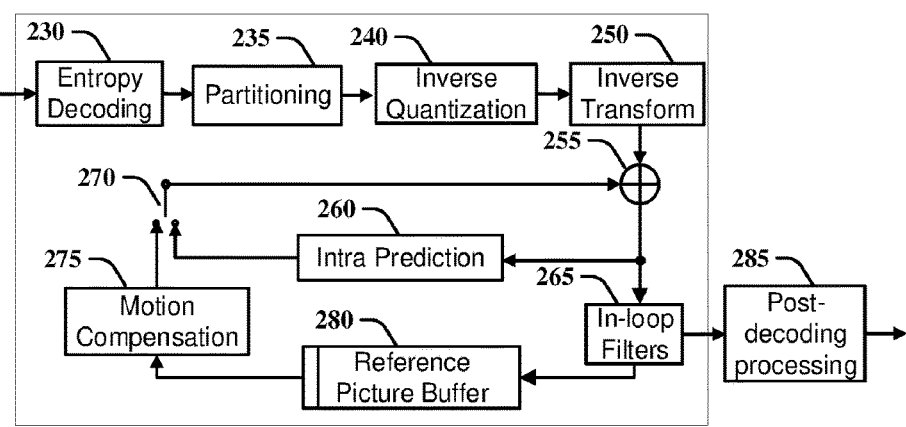
FIG. 22 illustrates a block diagram of an embodiment of video decoder in which various aspects of the embodiments may be implemented.
Figure 23:
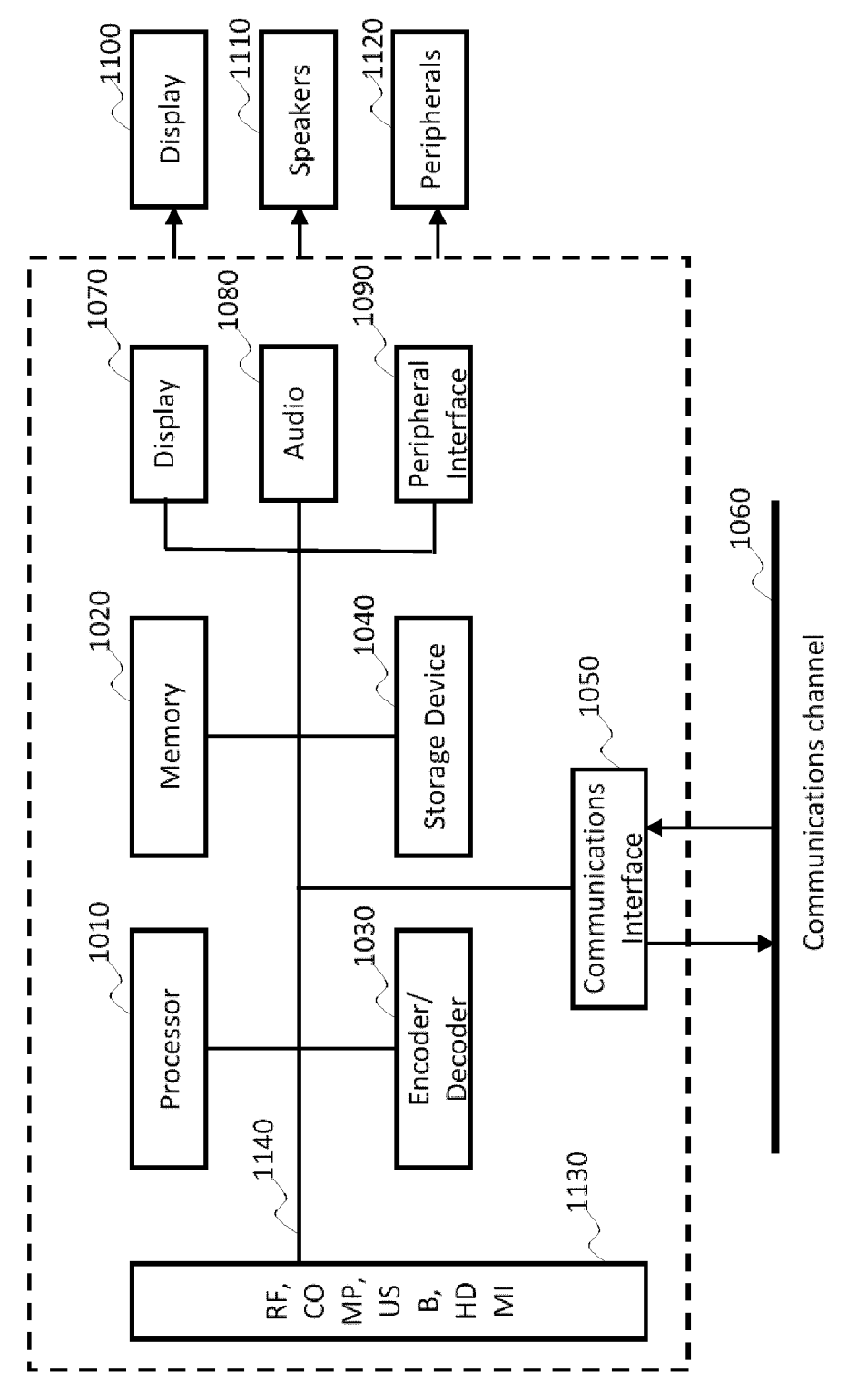
FIG. 23 illustrates a block diagram of an example apparatus in which various aspects of the embodiments may be implemented.

The aspects described and contemplated in this application can be implemented in many different forms. FIGS. 21, 22 and 23 below provide some embodiments, but other embodiments are contemplated and the discussion of FIGS. 21, 22 and 23 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 21 and FIG. 22. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, number of intra prediction mode, parameters of the neural networks (layer, output range, threshold). The specific values are for example purposes and the aspects described are not limited to these specific values.

FIG. 21 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 22 illustrates a block diagram of a video decoder 200. In the decoder 200, a bitstream is decoded by the decoder elements as described below. Video decoder 200 generally performs a decoding pass reciprocal to the encoding pass as described in FIG. 21. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 23 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 23, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, determining for a current block a neural network intra prediction and side information using a neural network from at least one input data, encoding the current block based on the neural network intra prediction; and encoding the side information.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, receiving for a current block an information relative to a side information of a neural network intra prediction; determining a neural network intra prediction for the current block using a neural network applied to at least one input data and side information; and decoding the block using the determined neural network intra prediction.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, deepFlag, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion. However, according to at least one embodiment, the rate distortion optimization in the encoding is removed as the deep intra prediction mode is the only available mode for intra prediction.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for deep intra prediction. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying the intra prediction process applied in the decoder and/or encoder.

Using a neural network in the intra prediction process applied in the decoder and/or encoder.

Determining a neural network intra prediction and side information using a neural network from at least one input data in the encoder;

Determining a neural network intra prediction using a neural network applied to at least one input data and received side information in the decoder;

Encoding side information generated by the intra deep predictor in the encoder;

Decoding side information to be used by the intra deep predictor in the decoder;

For luma block, the input data of the neural network intra predictor in the encoder comprises a context surrounding the luma block and luma block;

For luma block, the input data of the neural network intra predictor in the decoder comprises a context surrounding the luma block and decoded side information;

For chroma block, the input data of the neural network intra predictor in the encoder comprises a context surrounding the chroma block, the context surrounding the luma block that is collocated with the chroma block, and the chroma block.

For chroma block, the input data of the neural network intra predictor in the decoder comprises a context surrounding the chroma block, the context surrounding the luma block that is collocated with the chroma block, and the generated side information.

For chroma block, the input data of the neural network intra predictor in the encoder comprises the context surrounding the luma block that is collocated with the chroma block, and the chroma block.

For chroma block, the input data of the neural network intra predictor in the decoder comprises the context surrounding the luma block that is collocated with the chroma block, and the generated side information.

For chroma block, the input data of the neural network intra predictor in the encoder comprises a context surrounding the chroma block, the context surrounding the luma block that is collocated with the chroma block, the chroma block and the reconstructed luma block.

For chroma block, the input data of the neural network intra predictor in the decoder comprises a context surrounding the chroma block, the context surrounding the luma block that is collocated with the chroma block, the reconstructed luma block, and the generated side information.

Any of the variant of input data for luma and chroma block further comprising as input data the intra prediction mode L of the block located on the left side of the block and the intra prediction mode A of the block located above the block.

Inserting in the signaling syntax elements that enable the decoder to identify the intra prediction method to use.

Selecting, based on these syntax elements, the intra prediction method to apply at the decoder.

Inserting in the signaling a syntax element DeepFlag representative of the neural network-based intra prediction mode among syntax elements of intra prediction modes.

Enabling, from the syntax element, only one of neural network-based intra prediction mode and planar intra prediction mode for luma intra prediction.

Enabling only neural network-based intra prediction mode.

A bitstream or signal that includes one or more of the described syntax elements, or variations thereof.

A bitstream or signal that includes syntax conveying information generated according to any of the embodiments described.

Inserting in the signaling syntax elements that enable the decoder to determine deep intra prediction used in the encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs intra prediction according to any of the embodiments described.

A TV, set-top box, cell phone, tablet, or other electronic device that performs intra prediction according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs intra prediction according to any of the embodiments described.

A TV, set-top box, cell phone, tablet, or other electronic device that receives (e.g. using an antenna) a signal over the air that includes an encoded image, and performs intra prediction according to any of the embodiments described.

The invention claimed is:

1. A method comprising:

decoding from a bitstream, for a luma block being decoded in a picture of a video, a side information for a neural network intra prediction, the side information and the neural network intra prediction having been generated at encoding by applying a neural network to the luma block and to a context surrounding the luma block, the side information comprising neural network feature values encoded into the bitstream;

determining, for the luma block being decoded, a luma component of the neural network intra prediction by applying a neural network to the side information and to the context surrounding the luma block, wherein the side information guides the neural network intra prediction at the decoding; and decoding the luma block using the determined neural network intra prediction.

2. The method of claim 1, further comprising:

decoding, for a chroma block being decoded in the picture of the video, a side information for the neural network intra prediction, the side information and the neural network intra prediction having been generated at encoding by applying the neural network to a context surrounding the chroma block and the context surrounding the luma block; and determining, for the chroma block, a chroma component of the neural network intra prediction by applying a neural network to the context surrounding the chroma block, the context surrounding the luma block, and the side information.

3. The method of claim 1, further comprising:

decoding, for a chroma block being decoded in the picture of the video, a side information for the neural network intra prediction, the side information and the neural network intra prediction having been generated at encoding by applying the neural network to a context surrounding a luma block that is collocated with the chroma block; and determining, for the chroma block, a chroma component of the neural network intra prediction by applying a neural network to the context surrounding the luma block that is collocated with the chroma block and the side information.

4. The method of claim 1 further comprising:

decoding a syntax element indicating that a neural network-based intra prediction is used for intra prediction of the luma block.

5. An apparatus comprising one or more processors, wherein the one or more processors are configured to:

decode from a bitstream, for a luma block being decoded in a picture of a video, a side information for a neural network intra prediction, the side information and the neural network intra prediction having been generated at encoding by applying a neural network to the luma block and to a context surrounding the luma block, the side information comprising neural network feature values encoded into the bitstream;

determine, for the luma block being decoded, a luma component of the neural network intra prediction by applying a neural network to the side information and to the context surrounding the luma block, wherein the side information guides the neural network intra prediction at the decoding; and decode the luma block using the determined neural network intra prediction.

6. The apparatus of claim 5, wherein the one or more processors are configured to:

decode, for a chroma block being decoded in the picture of the video, a side information for the neural network intra prediction, the side information and the neural network intra prediction having been generated at encoding by applying the neural network to a context surrounding the chroma block and a context surrounding a luma block that is collocated with the chroma block; and

determine, for the chroma block, a chroma component of the neural network intra prediction by applying a neural network to the context surrounding the chroma block, the context surrounding the luma block, and the side information.

7. The apparatus of claim 5, wherein the one or more processors are configured to:

decode, for a chroma block being decoded in the picture of the video, a side information for the neural network intra prediction, the side information and the neural network intra prediction having been generated at encoding by applying a neural network to a context surrounding a luma block that is collocated with the chroma block;

determine, for the chroma block, a chroma component of the neural network intra prediction and side information by applying a neural network to the a context surrounding the luma block and the side information.

8. The apparatus of claim 5, wherein the one or more processors are configured to:

decode a syntax element indicating that a neural network-based intra prediction is used for intra prediction of the luma block.

9. A method for video encoding, comprising:

determining, from a luma block being encoded in a picture of a video, by applying a neural network to the luma block and to a context surrounding the luma block, a luma component of a neural network intra prediction and a side information to guide neural network intra prediction at decoding, the side information comprising neural network feature values;

encoding the luma block based on the neural network intra prediction; and encoding the side information into a bitstream.

10. The method of claim 9, further comprising:

determining, for a chroma block collocated with the luma block being encoded in the picture of the video, a chroma component of the neural network intra prediction and side information by applying the neural network to the chroma block and to the context surrounding the luma block; and encoding the chroma block based on the determined neural network intra prediction.

11. The method of claim 9, further comprising:

determining, for a chroma block being encoded in the picture of the video, a chroma component of the neural network intra prediction and side information by applying the neural network to a context surrounding the chroma block and the context surrounding the luma block; and encoding the chroma block based on the determined neural network intra prediction.

12. The method of claim 9, further comprising:

determining, for a chroma block being encoded in the picture of the video, a chroma component of the neural network intra prediction and side information by applying the neural network to a context surrounding a luma block that is collocated with the chroma block; and encoding the chroma block based on the determined neural network intra prediction.

13. The method of claim 9, further comprising:

encoding a syntax element indicating that a neural network-based intra prediction is used for intra prediction of the luma block.

14. An apparatus for video encoding, comprising one or more processors, wherein the one or more processors are configured to:

determine, from a luma block being encoded in a picture of a video, by applying a neural network to the luma block and to a context surrounding the luma block, a luma component of a neural network intra prediction and a side information to guide neural network intra prediction at decoding, the side information comprising neural network feature values;

encode the luma block based on the neural network intra prediction; and encode the side information into a bitstream.

15. The apparatus of claim 14, wherein the one or more processors are configured to:

determine, for a chroma block collocated with the luma block being encoded in the picture of the video, a chroma component of the neural network intra prediction and side information by applying the neural network to the chroma block and to the context surrounding the luma block; and encode the chroma block based on the determined neural network intra prediction.

16. The apparatus of claim 14, wherein the one or more processors are configured to:

determine, for a chroma block being encoded in the picture of the video, a chroma component of the neural network intra prediction and side information by applying the neural network to a context surrounding the chroma block and the context surrounding the luma block; and encode the chroma block based on the determined neural network intra prediction.

17. The apparatus of claim 14, wherein the one or more processors are configured to:

determine, for a chroma block being encoded in the picture of the video, a chroma component of the neural network intra prediction and side information by applying the neural network to a context surrounding a luma block that is collocated with the chroma block; and encode the chroma block based on the determined neural network intra prediction.

18. The apparatus of claim 14, wherein the one or more processors are configured to:

encode a syntax element indicating that a neural network-based intra prediction is used for intra prediction of the luma block.

* * * * *